United States Patent

[11] 3,582,936

[72] Inventors Martin N. Kite
Morton Grove;
Robert E. Gettings, North Brook; Roman
A. Adams, Skokie, all of, Ill.

[21] Appl. No. 704,967
[22] Filed Jan. 2, 1968
[45] Patented June 1, 1971
[73] Assignee The A. B. Dick Company
Chicago, Ill.

[54] SYSTEM FOR STORING DATA AND THEREAFTER CONTINUOUSLY CONVERTING STORED DATA TO VIDEO SIGNALS FOR DISPLAY
13 Claims, 22 Drawing Figs.

[52] U.S. Cl. .......... 340/324, 340/166, 340/172.5
[51] Int. Cl. .......... G06f 3/14
[50] Field of Search .......... 340/324.1, 166, 172.5

[56] References Cited

UNITED STATES PATENTS

| | | | |
|---|---|---|---|
| 3,422,420 | 1/1969 | Clark | 340/324 |
| 3,426,344 | 2/1969 | Clark | 340/324 |
| 3,444,319 | 5/1969 | Artzt et al. | 178/30 |
| 3,323,119 | 5/1967 | Barcomb et al. | 340/324.1 |
| 3,345,458 | 10/1967 | Cole et al. | 340/324.1 |
| 3,346,853 | 10/1967 | Koster et al. | 340/324.1 |
| 3,400,377 | 9/1968 | Lee | 340/324.1 |
| 3,406,387 | 10/1968 | Werme | 340/324.1 |
| 3,413,610 | 11/1968 | Botjer et al. | 340/324.1 |

*Primary Examiner*—John W. Caldwell
*Assistant Examiner*—Marshall M. Curtis
*Attorneys*—Samuel Lindenberg and Arthur Freilich

ABSTRACT: A system for continuously reading data out of memory, decoding said data, and using it to select representative video signals generated by a character generator, which are then displayed on a television monitor. Incoming data is stored in memory at an address corresponding to the location of a cursor displayed on the monitor. The system operates at frequencies used for home television receivers.

INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS INVENTORS
MARTIN N. KITE
ROBERT E. GETTINGS
ROMAN A. ADAMS
BY Lindenberg & Freilich
ATTORNEYS

SYSTEM FOR STORING DATA AND THEREAFTER CONTINUOUSLY CONVERTING STORED DATA TO VIDEO SIGNALS FOR DISPLAY

BACKGROUND OF THE INVENTION

This invention relates to apparatus for displaying in human language encoded data which is received from a data source. More particularly, this invention is directed to an improved data display system whereby the encoded data is decoded and then displayed on a monitor which can function at home television receiver frequencies.

OBJECTS AND SUMMARY OF THE INVENTION

Binary data, which is supplied to this embodiment of the invention, is stored character by character at locations in a memory which corresponds to the locations of a cursor, which is displayed on the face of the cathode-ray tube. This cathode-ray tube or television monitor is the one on which the data stored in the memory is to be displayed. The location of the cursor which is displayed on the face of the cathode-ray tube is determined by two counters respectively designated as a line and character counter. The location at which the next character is to be displayed on the face of the cathode-ray tube is provided by a display character counter and a display line counter. The address in the memory at which incoming data corresponding to a character is stored, is established by the address indicated by the counts in the display character counter and display line counter. Only when there is a coincidence between the counts of the cursor character counter and dynamic display character counter in addition to the cursor line counter and display line counter, is data-entered into the memory.

A novel character generator is provided which operates, in response to two counters which are continuously driven, to make available at its output video signals corresponding to every one of the possible alpha-numeric characters desired to be displayed. A video selector circuit is employed which, in response to an encoded character readout of memory, selects from the character generator output the video signals which can be displayed to present that character. The video signal output of the video selector is then applied to be displayed by the cathode-ray tube at a location thereon corresponding to the one in the memory from which the encoded character was read out.

DESCRIPTION OF THE PREFERRED EMBODIMENTS

Figure 1:
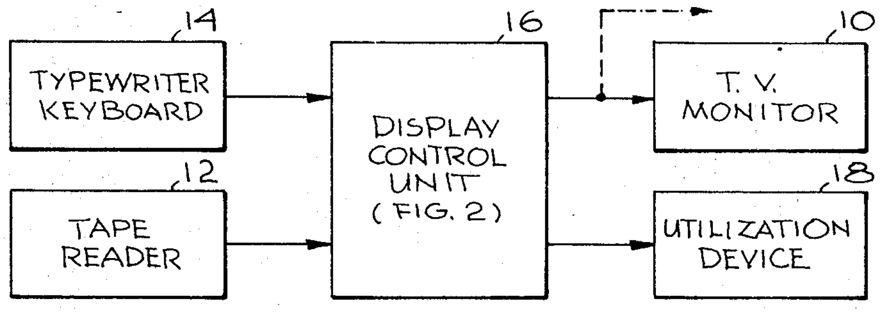
FIG. 1 is a block diagram illustrating the general layout of a display system in accordance with this invention.

Referring now to FIG. 1, a general arrangement in accordance with this invention would comprise a standard TV monitor 10, (more than one may be used if required,) which displays human readable data. Digital data may be entered into the system from any data source, illustrative of which there is shown a tape reader 12 and/or a typewriter keyboard 14. This data is fed into a display control unit 16 whose function it is to store the data in a manner so that it may be properly read out for display on the TV monitor or sent to some other utilization device 18, such as Keypunch, a print out device, etc. The display control unit also includes a novel character generator which, in response to the data representative code produces the video signals which are displayed as readable data on the TV monitor 10.

Figure 2:
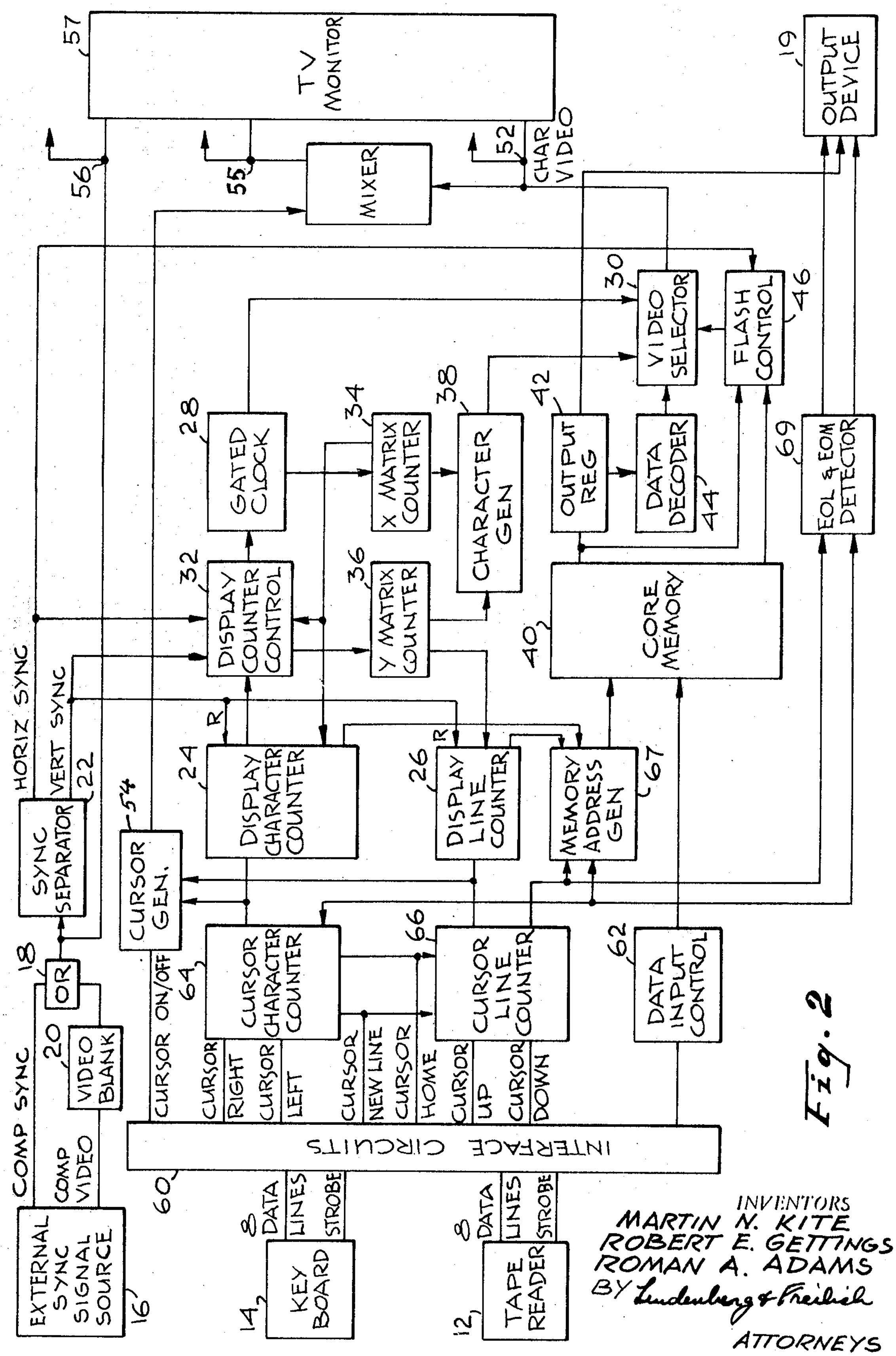
FIG. 2 is a detailed block diagram of a display control unit in accordance with this invention.

FIG. 2 is a block schematic diagram illustrating details of the display control unit. A tape reader 12 or a typewriter keyboard 14 are well known, and commercially available pieces of hardware and may be used as data input devices to this system. For the purposes of this invention, and in the manner that they function normally, the tape reader produces as an output eight binary signals together with a strobe pulse, each time a character is read out. Seven of the eight bits represent an alpha-numeric character. The eighth bit is parity. The keyboard 14, which can be a facsimile typewriter, also produces at its output 7-bit character signal with an eighth bit having parity significance, together with a strobe pulse. In each of these cases, the signals are produced in parallel on eight data lines and a strobe pulse is produced on a ninth line. The signals are applied to interface circuits 60.

Basic operating synchronization signals for this display control unit may be obtained from an external source of sync signals 16. This external sync signal source may comprise either a television station sync generator, or a composite video signal such as may be obtained from a video tape device. Signals from either of these may be processed to provide horizontal sync signals and vertical sync signals. If composite video is provided, this is applied directly to an OR gate 18 the output of which goes to a sync separator circuit 22. This functions in well-known manner to separate the horizontal sync from the vertical sync. If composite video is provided by the external video signal source, then this is applied to a video blanking circuit 20, which constitutes well-known circuitry for applying a blanking pulse to the composite video during the video interval. This leaves composite sync signals. These are applied to the OR gate 18 and thereafter to the sync separator circuit to be separated into horizontal and vertical sync signals.

The composite sync signals, which are the output of the OR gate 18 are supplied, at the output of the display control unit, to the TV monitor which is used to reproduce the video signals. The vertical sync or vertical drive pulse which is the output of the sync separator 22, is used to reset a display character counter 24, and a display line counter 26, to assure that each field which is to be displayed starts properly. The display character counter has its count advanced by one, for each character being displayed on a line of characters. The display line counter 26 has its count advanced by one for each line of characters which is displayed. Thus, the address of the last character being displayed is always available from the output of these counters. Actual video display commences after the first 24 horizontal sync pulses which follow the vertical sync pulse and continues until 16 rows of character video are displayed.

There are 32 characters on each line. The first horizontal sync pulse initiates the operation of a display counter control circuit 32. The counter control circuit can start a gated clock circuit 28 where frequency equals the picture element rate of 8 megacycles. The start of the operation of the gated clock is delayed, following the horizontal drive pulse, by approximately 12 micro seconds until the first character position in a line of characters is reached. The clock turns on and then continues to operate until the final character in a line is completed. Each character position is defined by a dot matrix in which only those dots are illuminated which form a desired character. Each character uses nine dot positions along a line for the actual character display plus three guard band positions. The total number of clock pulses generated per line is therefore 12 times 32 (32 characters per line) or 384 pulses.

The display counter control also receives vertical sync pulses which are used for reset purposes. The gate clock output is used to drive an $x$-matrix counter 34, causing it to count through 12 counts, nine counts of which correspond to nine horizontal positions in a character dot matrix starting from left to right, and the three further counts provide for the guard band or character spacing. The $x$-matrix counter 34 therefore goes through a full cycle of operation for each character. Each time the $x$-matrix counter completes a cycle of 12 counts, it overflows. Its overflow is applied to the display character counter 24 to cause it to advance one count. The display character counter has a count capacity totaling 32, corresponding to the number of characters displayed in each row. Each time the display character counter overflows, it sends the overflow pulse back to the display counter control 32 which in turn uses this overflow pulse to turn off the gated clock 28. The gated clock then waits for the next horizontal sync pulse before commencing operation again. The overflow output pulse of the display counter control also enables a $y$-matrix counter 36 to be advanced one count in response to the next horizontal sync pulse.

The $y$-matrix counter has a total count capacity of 14 counts. Eleven of these are used to count the vertical dot matrix locations of a character. Three of these are for a guard band space between lines of characters. The overflow output of the $y$-matrix counter 36 is applied to the display line counter 26 to cause it to advance one count. The display line counter has a total count capacity of 16 corresponding to the 16 lines of characters which are displayed in one field of this invention.

A character generator 38 is provided which has applied thereto the count outputs of the $x$ and $y$ matrix counters. In response to these, the character generator generates video signals representing each one of the alpha-numeric characters which the system is capable of displaying. In an embodiment of the invention which has been built and successfully operated, the character generated created 64 alpha numeric characters. The output of the character generator is applied to the video selector 30. This functions to select, in response to a 7-bit alpha-numeric code derived from the core memory 40 of the system, a specific character from all of those being applied to the video selector, which character is represented by that alpha-numeric code. More specifically, the core memory 40 supplies coded signals, one character at a time to an output register 42, which in turn applies them to a data decoder 44 which decodes them successively and enables the video selector to select the proper video character signals. In addition, the video selector 30 is capable of being modulated by a flash control circuit 46. THE FLASH CONTROL CIRCUIT CONTAINS AN OSCILLATING circuit that may be turned on by a flash code which is stored in the memory and which is a "nonviewable" character. The flash control 46 remains on until either the next following horizontal drive pulse appears or a space code which separates the following word appears. Operation of the flash control 46 causes all characters of a word that are displayed thereafter to flicker and thus call attention to itself.

After each character is displayed, an unload cycle of the core memory 40 is made to occur to place the alpha-numeric signals corresponding to the next character of a row in the output register 42. The address from which the character in core memory is read is provided by the count conditions of the display character counter and display line counter. A specific core memory address is provided for each of the 512 counts which these counters provide. The display character counter 64 and display line counter 66 have their outputs connected to a memory address generator 67, which produces the address information for the core memory 40.

The output of the video selector 30, which comprises the character video signals is applied to a mixer circuit 50 and to an output terminal 52. The mixer circuit combines character video signals with a cursor signal which is provided from a cursor generator 54. The cursor video signal has approximately one-half of the intensity of the character signals. The cursor video signal indicates, on the pattern displayed on the face of the television monitor, the corresponding character signal address in the memory into which the next input character digital signals will be placed when the system is in the write mode. The mixer output is applied to an output terminal 55. In addition, composite sync signals from the output of the OR gate 18 are made available at a terminal 56. These three signals, namely composite sync, character video with cursor, and character video without cursor, are thus available at the three output terminals for being applied to a television monitor for display.

The tape reader 12 and the keyboard 14 have their outputs connected to the interface circuitry 60. The interface circuitry serves to check the incoming data lines from either of the two inputs upon receipt of its associated data strobe presented on the strobe lines. If the data is alpha-numeric data to be displayed, the input strobe signal triggers a single load cycle of the core memory. This function is provided by the data input control circuit 62. In the load cycle operation, the input character is loaded into the core memory at an address which is determined by the count outputs of the cursor character counter 64 and the cursor line counter 66. The cursor generator 54 detects coincidence between the cursor counters and the display counters and causes the load operation to occur when these counters have the same count. As previously indicated, this occurs at an address in memory corresponding to the position visually indicated by the cursor on the output monitor. Thus, the load operation into the core memory occurs at a location which corresponds to the location of the cursor. From the foregoing it will be appreciated that the memory should provide storage for 512 alpha-numeric characters of eight bits per character.

Other signals from the interface circuit are provided in response to the incoming control codes. These specific control codes do not result in a memory load cycle but rather generate signals on appropriate lines out of the interface circuit. These lines perform such functions as cursor on-off, cursor right, cursor left, cursor new line, cursor home, cursor up, cursor down, etc. This will become more clear as this explanation progresses.

During the write mode, as each character is loaded into the core memory, a single pulse advances the cursor character counter by one count. When the cursor character counter overflows, its output advances the cursor line counter. Input load operations therefore, cause the cursor to be advanced character by character and line by line in a manner similar to the typing operation of a typewriter.

The output register 42 may also be used if desired to transmit data which is within the memory to an external utilization device 19 such as tape or a transmitter or an external printer. An "end of line" or "end of message" circuit 69 driven by the cursor counters, may be used in conjunction with external transmission of data to signal their occurrences to external equipment.

DISPLAY COUNTER CONTROL CIRCUIT 32

FIGURE 3

Figure 3:
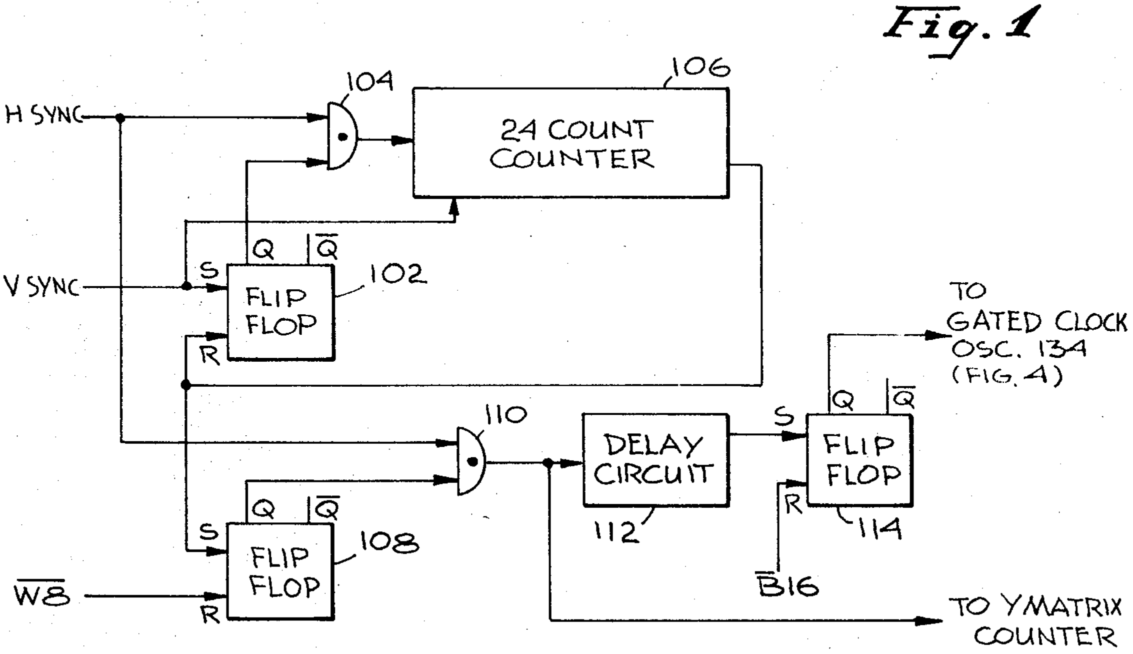
FIG. 3 is a block schematic drawing of the display counter control circuit 32.

FIG. 3 is a block schematic diagram of the display counter control circuit. This circuit arrangement functions to initiate operation of the gated clock oscillator at the proper time so that the subsequent matrix and display counters may commence to operate at the proper time and in the proper time sequence. In a television-type display both a top margin as well as a left side margin must be provided for. Essentially the display counter control circuit provides for these delays. The first vertical sync pulse which is delivered by the output of the sync separator 22 is applied to a flip-flop 102 to drive it to its set state. This causes the Q output of the flip-flop to become high. The Q output of the flip-flop enables an AND gate 104 whereby it can pass horizontal sync pulses which are received from the sync separator. These are applied to drive a 24 count counter 106. This counter provides a top margin delay. The 24th count of the counter is used to reset the flip-flop 102 and sets a flip-flop 108. The next vertical sync pulse enables flip-flop 102 again and simultaneously resets the 24 count counter so it can begin counting again.

The Q output of flip-flop 108 enables an AND gate 110 to pass horizontal sync pulses. The output of the AND gate 110 is applied to a delay circuit 112. The delay circuit provides a delay whose duration is determined by the size of the desired left-hand margin on the display tube. The output of delay circuit 112 sets a flip-flop 114. The Q output of the flip-flop 114, which is high in response to its set input being enabled, is applied to the gated clock oscillator to cause it to commence to produce clock pulses.

Flip-flop 114 is reset by a $\overline{\mathbf{B16}}$ output, which is received from the display character counter which counts the number of characters displayed on a line. After the last character has been displayed flip-flop 114 is reset so that at the commencement of the next line, signaled by the appearance of another horizontal sync pulse, a delay is provided on the left-hand side of the display tube. The flip-flop 108 is reset by a $\overline{\mathbf{W8}}$ signal which is provided by the display line counter. This signal occurs after the last character on the last line has been displayed. Accordingly, flip-flop 108 cannot be set again until the counter 106 has counted through its next 24 counts to provide the top margin delay.

X AND Y MATRIX COUNTERS (34—36)

FIGURE 4

Figure 4:
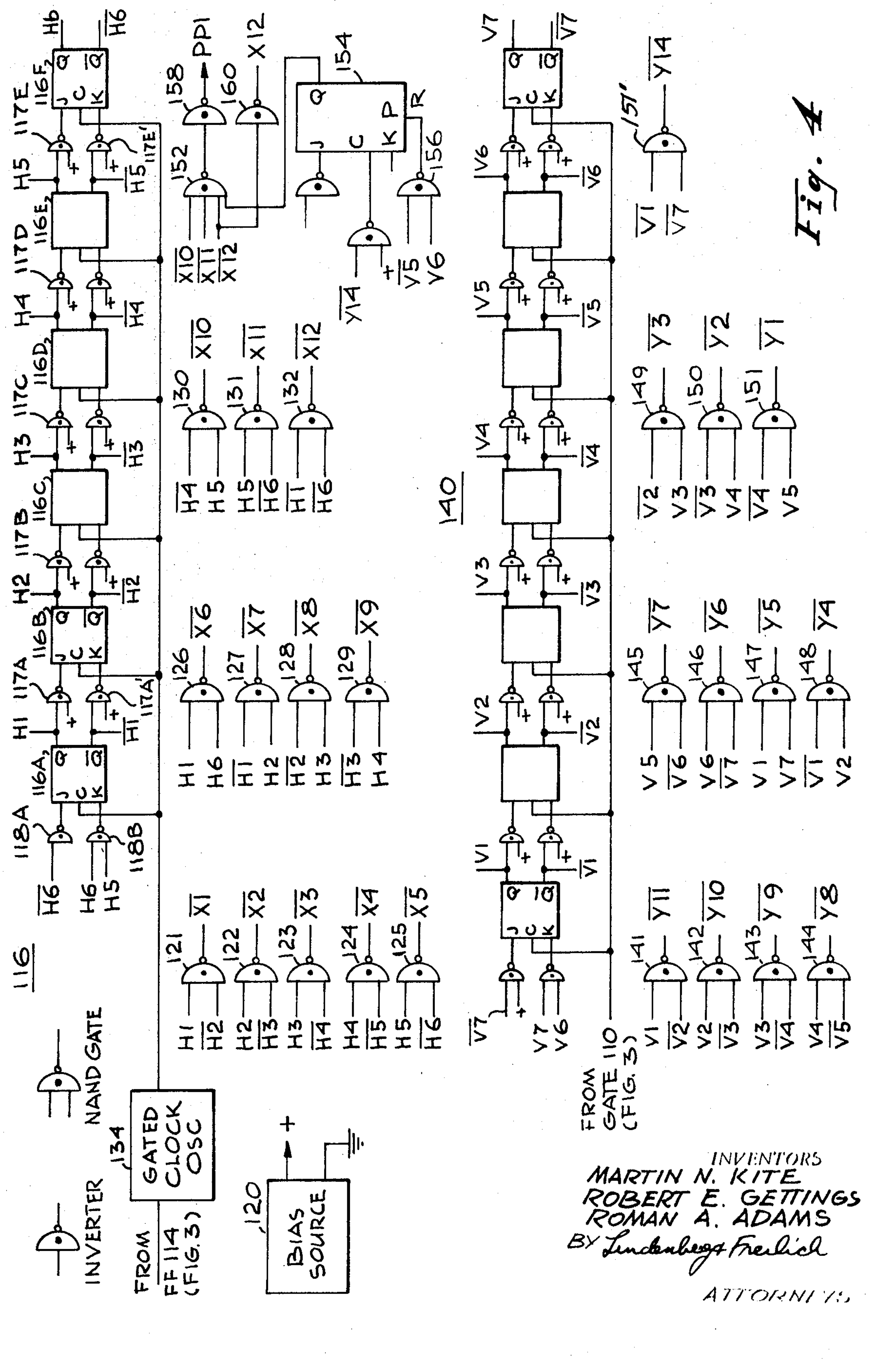
FIG. 4 is a block schematic drawing of the X and Y matrix counters.

FIG. 4 is a block schematic diagram of the *x* and *y* dot matrix counters. A character, in accordance with this invention, is made by illuminating selected dots in a dot matrix that extends nine dots in a horizontal direction and 11 dots in a vertical direction. There are three dot spaces allowed between characters on a line to serve as a guard band, and three dot spaces between lines of characters, also to serve as a guard band. Thus, the counter that counts for the horizontal dot placement will have a count capacity of 12 and the counter that counts for the vertical dot placement will have a count capacity of 14.

In FIG. 4, there is shown a horizontal counter 116 which is made up of six flip-flops, respectively 116A through 116F. Each one of these flip-flops is of the type known as "JK" flip-flop. It is well known and commercially purchasable.

Each flip-flop has J, K and C inputs, and Q and $\overline{Q}$ outputs. When a clock pulse is applied to its C input the flip-flop will transfer to its outputs the state of its J and K inputs. Thus, if the J input is high and the K input is low when a C or clock pulse is applied to the C input, the Q output will be high and the $\overline{Q}$ output will be low. The J and K inputs are applied to the respective flip-flops from the Q and $\overline{Q}$ outputs of the respective flip-flops through NAND gates. A NAND gate behaves like an AND gate followed by an inverter. Accordingly, when the two inputs to the NAND gate are high, its output is low and when the inputs to the NAND gate are low, its output is high. When one of the inputs is high and the other is low, the NAND gate output is high.

The counter 116 has the Q and $\overline{Q}$ outputs of the respective flip-flops 116A through 116E respectively connected to the J and K inputs of the immediately following flip-flops through the respective NAND gates 117A and 117A' through 117E and 117E'. NAND gates 118A and 118A' are connected to the respective J and K inputs of flip-flop 116A. the NAND gate 118A has one input connected to the $\overline{Q}$ output of flip-flop 116F which is designated as $\overline{H6}$. The NAND gate 118A has its inputs respectively connected to the Q outputs of respective flip-flops 116E and 116F. It advances in response to pulses obtained from the output of Gate 110 in FIG. 3. These are essentially horizontal sync pulses. These Q outputs are respectively designated as H5 and H6.

It should be noted that whenever a designation is shown for only one NAND gate input, the other input of the NAND gate is connected to a bias source 120. As the result, a one input NAND gate acts as an inverter to invert the input.

The respective Q and $\overline{Q}$ outputs of flip-flops 116A through 116F are respectively designated as H1 through H6 and $\overline{H1}$ through $\overline{H6}$. These are collected by the 12 NAND gates respectively 121, through 132 to provide 12 output count indications in their not form. These are designated by $\overline{X1}$ through $\overline{X12}$. Thus, upon the occurrence of an H1 and $\overline{H2}$ input to NAND gate 121, it will produce an output designated as $\overline{X1}$, which is the first output count of the counter. H1 and H6 occurring at the input of NAND gate 126 produce an $\overline{X6}$ output $\overline{H1}$ and $\overline{H6}$ occurring simultaneously at the input of NAND gate 132 produces an $\overline{X12}$ output or a not 12 count output.

The manner in which the counter 116 functions is for each one of the flip-flops to successively assume its one state or state with its Q output high and thereafter each flip-flop successively returns to the state with its $\overline{Q}$ output high. The counter is cyclic and will repeat this operation in response to successive applications of clock pulses from the gated clock oscillator 134. This oscillator comprises a circuit which, in the presence of an enabling input from flip-flop 114 in FIG. 3, provides successive clock pulses, to the counter 116.

To illustrate how the counter works, assume initially that all the flip-flop stages are in their zero state. The $\overline{Q}$ output of flip-flop 116F is high. Upon the occurrence of the first clock pulse from the gated clock oscillator 134, flip-flop 116A will be driven to its one state with its Q output high, since its J input is now high and its K input is low. Upon the occurrence of the next clock pulse, flip-flop 116B assumes a one state. This progresses with successive clock pulses until flip-flop 116F assumes its one state. Since, the K input to flip-flop 116A is driven to its high state in response to H6 and H5 which are connected to the NAND gate 118A being high, flip-flop 116A is driven to its zero state with its $\overline{Q}$ output high. This zero state of the counter 116A is successively passed with the occurrence of each clock pulse to all of the flip-flops in the counter. From an understanding of the operation of this counter, it should now be understood how the inputs to the NAND gates 121 through 132 operate to produce the indicated counter outputs.

Counter 140 is identical in construction with counter 116, except that it has one more flip-flop. Accordingly, it can produce 14 count outputs. The NAND gates 141 through 150 are connected to the flip-flop outputs for the purpose of deriving the respective counts 1 through 14 which are in their "-not" form. The Q and $\overline{Q}$ outputs of the respective flip-flops of the counter 140 are respectively designated from V1 through V7 and from $\overline{V1}$ to $\overline{V7}$. The counter 140, which counts for the vertical dot positions is given a count capacity of 14 counts. Since it is customary to reference the bottom line of a character as a first position and the top of a character as the last position, assuming each location or position of a line were given a number, the bottom of a character would be considered in the Y1 location and the top would be considered in the Y11 location. Therefore, while the present invention displays a character in television raster form, where the top of the character appears first and the bottom last, the count output of the Y matrix counter is given a reverse count designation. That is, the first count of the counter is designated as $\overline{Y11}$ the 11 count of the counter is designated as $\overline{Y1}$. $\overline{V1}$ and $\overline{V7}$, which are generated when all of the stages of the counter are in their zero state, are combined to produce a Y14 count. The reasoning for this arrangement will become more clear with a description of FIG. 5.

FIG. 4 shows how pulse signals $\overline{X1}$ through $\overline{X12}$ and $\overline{Y1}$ through $\overline{Y11}$ are generated. In addition to these signals, other logic signals are required for the operation of this invention. Thus, in FIG. 4, a NAND gate 152 is used to collect $\overline{X10}$, $\overline{X11}$ and $\overline{X12}$ together with the Q output of a flip-flop 154. The Q output of the flip-flop 154 is enabled when a $\overline{Y14}$ signal is applied to its clock input. The flip-flop remains set until the occurrence of a $\overline{Y12}$ signal. This is produced when counter 140 provides a $\overline{V5}$ and $\overline{V6}$ output to a NAND gate 156. Thus, flip-flop 154 is set at the end of a counting cycle of counter 140 and is reset upon the occurrence of the 12th count output of the flip-flop 140. The output of NAND gate 152 is inverted by NAND gate 158 to produce a signal designated as PP1. The $\overline{X12}$ or "not 12" count of the counter 116 is inverted by a NAND gate 160 to produce an X12 count.

EXAMPLE OF A DOT MATRIX CHARACTER

FIGURE 5

Figure 5:
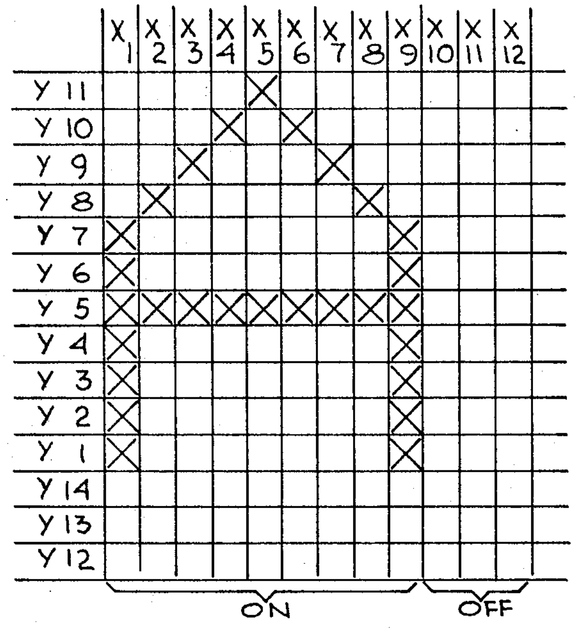
FIG. 5 illustrates a character constructed of selected dots in a dot matrix in accordance with this invention.

FIG. 5 shows the appearance of a character, "A," constructed of selected dots in a dot matrix in accordance with this invention, with the appropriate designations applied to the possible dot locations which may be used for representing a character. There may be as many as 32 of these characters displayed in a line across the face of the display tube. There may be as many as 16 of these lines displayed vertically. These values are given by way of illustration of an operative embodiment of the invention which has been built, and are not to be construed as a limitation upon the invention.

DISPLAY LINE COUNTER AND DISPLAY CHARACTER COUNTER

FIGURE 6

The display line counter and the display character counter respectively 26 and 24 are each the usual binary counters with respective count capacities of 16 and 32. Each time an $\overline{X10}$ signal is generated by the X matrix counter 34, the display character counter is advanced one count. Each time a $\overline{Y14}$ signal is generated by the Y matrix counter 36, the display line counter is advanced one count. The display character counter has its respective outputs designated B1, $\overline{B1}$, B2, $\overline{B2}$, ... through B16, $\overline{B16}$. The display line counter has its outputs designated as W1, $\overline{W1}$, W2, $\overline{W2}$, ... W8, $\overline{W8}$. The character counter is the one which keeps track of the number of characters on a line, for which 32 are allows. The $\overline{B16}$ output of the character counter, referring back to FIG. 3, is the output which turns off the gated clock oscillator. This occurs when the last character in a line has been displayed. The last output of the display line counter, which is designated as $\overline{W8}$ is the one which turns off flip-flop 108 in FIG. 3. This occurs at the end of the last line which is displayed,

CURSOR GENERATOR 54 AND COUNTERS 64, 66

FIGURE 7

Figure 7:
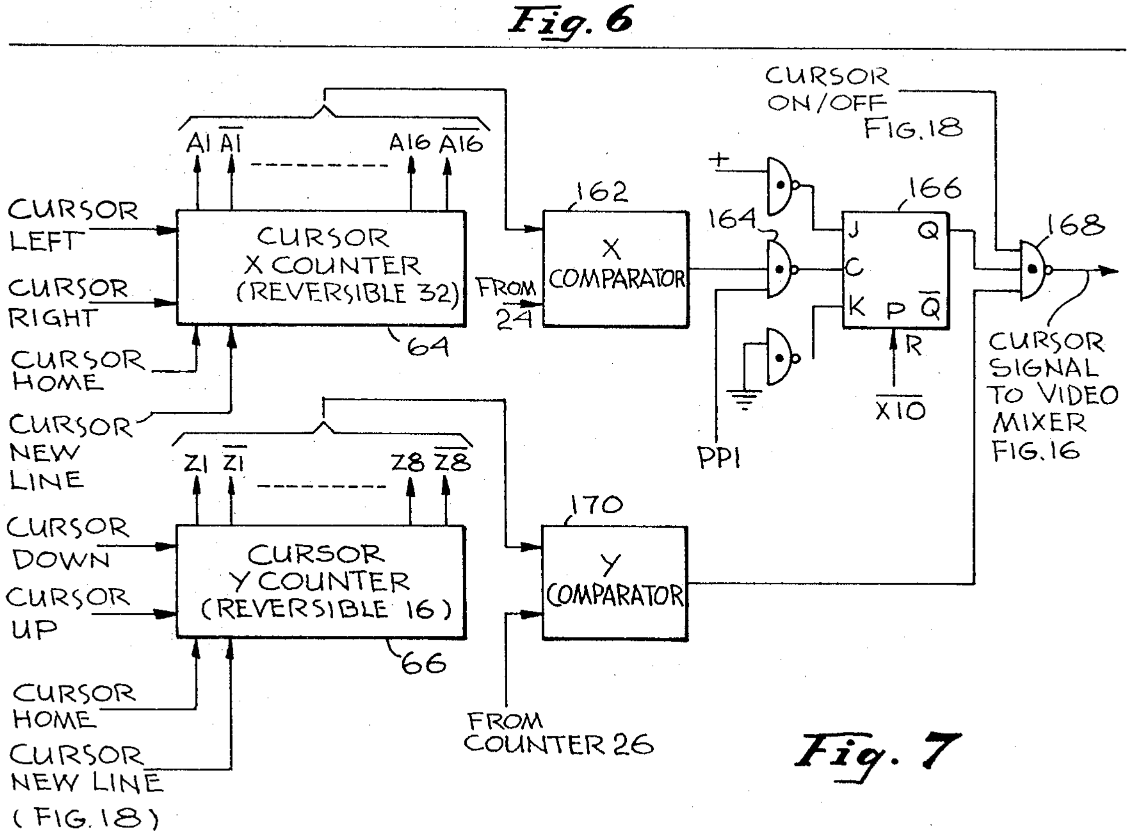
FIG. 7 is a block schematic diagram of the cursor generator and line and character counters.

The cursor X counter 64 as shown in FIG. 7, is a reversible counter having any of the well-known reversible counter constructions. Its 32 outputs are respectively designated at A1, $\overline{A1}$ through A16, $\overline{A16}$. This counter is advanced by receiving a signal from whatever external data input device is employed. A signal for advancing the counter is supplied with each character when the display control is in its "write" mode. Such a signal is supplied from the typewriter to the "cursor right" input of the counter. The counter may be made to count in reverse by receiving an input signal on its "cursor left" terminal, from the typewriter keyboard. The cursor signal, which by way of example has been indicated as a background display of half intensity for a character, will occur at the proper time, at a location along a line determined by the count output or by the address represented by the count output of counter 64.

A cursor Y counter, which is similar in construction and operation to the cursor X counter, has a 16 count capacity and is also reversible. This counter is advanced by signals from the keyboard applied to its "cursor down" terminal and is caused to count backwards in response to pulses received which are applied to its "cursor up" terminal. This counter establishes, by its output, the line address on which the cursor signal is displayed. The output of this counter is designed by Z1, $\overline{Z1}$ to Z8, $\overline{Z8}$, with the Z8 signal being the 16th or highest count output of the counter.

Figure 6:
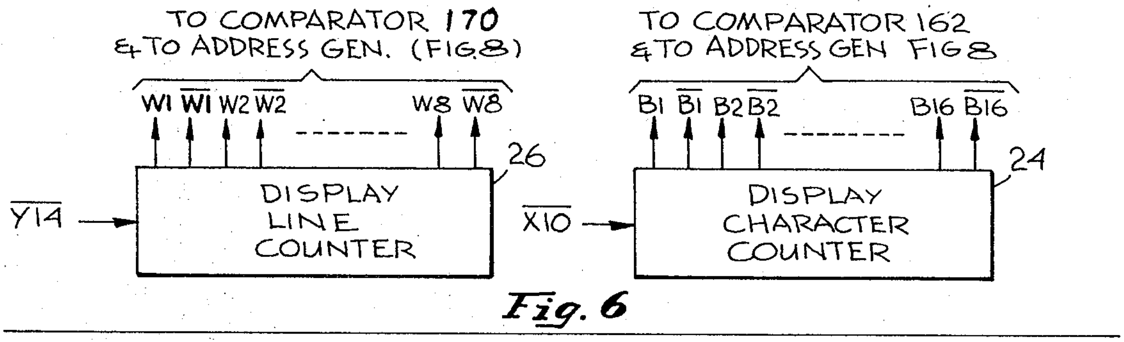
FIG. 6 is a block schematic of the Display Line and Character Counters.

The cursor is displayed only when there is a concurrence in the address indicated by the cursor counters and the display counters. To achieve this operation, a comparator circuit 162 compares the address outputs of the counter 64 and the counter 24, shown in FIG. 6, and when there is an identity it provides an output signal to a NAND gate 164. Another input to this NAND gate is the PP1 signal which is generated by the logic shown in FIG. 4. This PP1 signal, in view of the presence of the inverter 158, (in FIG. 4), is present from $\overline{X1}$ through $\overline{X9}$ time. From $\overline{X10}$ through $\overline{X12}$ time, the PP1 signal is not present and no output is obtained from NAND gate 164. Upon the occurrence of a comparator signal and a PP1 signal, a JK flip-flop 166 is driven so that its Q output is high. This flip-flop is reset upon the occurrence of an $\overline{X10}$ signal.

The occurrence of the cursor on a particular line is determined by the output of a comparator 170. This comparator compares the addresses provided by the output counts of the cursor counter 66 and the display line counter 26. The output of the *y* comparator 170 is applied to the NAND gate 168. The typewriter keyboard 14 will have a key which can be operated to actuate a circuit which can provide a voltage to a third input to the NAND gate 168 designated as the "cursor on-off" input. When this voltage is not present, no cursor is provided. This circuit is shown subsequently herein in FIG. 18.

Therefore, NAND gate 168 functions to provide a cursor signal output when there is a concurrence in the addresses at the outputs of the cursor *x* and *y* counters and the display character and line counters. Since the display counters are sequenced continuously through their count states, there will be concurrence of cursor and character counters only at one location over the entire face of the display tube. Accordingly, the cursor will be displayed at one character location only.

The memory storage device which is employed with this embodiment of the invention should be able to store, for readout onto the face of a display tube, as many characters as will be displayed across the face of the tube. The example given by way of illustration herein is 32 times 16 or 512 characters, or more correctly the code bits to represent 512 characters. Thus a total of at least 8×512 or 4,096 bits is required. There should be a character location in the memory which corresponds to the location on the display tube face at which that character is to be displayed. The memory must be addressed successively for the purpose of successively reading out the characters for display. The successive addressing of the memory is a function of the display counters.

The address of a location in the memory into which data is to be entered is indicated by the address of the cursor. This address can be changed by applying signals to the cursor counters which establish the line and the location along the line desired for the cursor, and thereby the location in the memory into which data will be introduced. The cursor counters may be advanced by actuation of the typewriter keyboard in a normal manner for the purpose of writing character by character into the memory. Provision may also be made for advancing the cursor counters when input of characters is from a tape reader or any other source.

END OF LINE OR END OF MESSAGE INDICATOR

FIGURE 7A

Figure 7A:
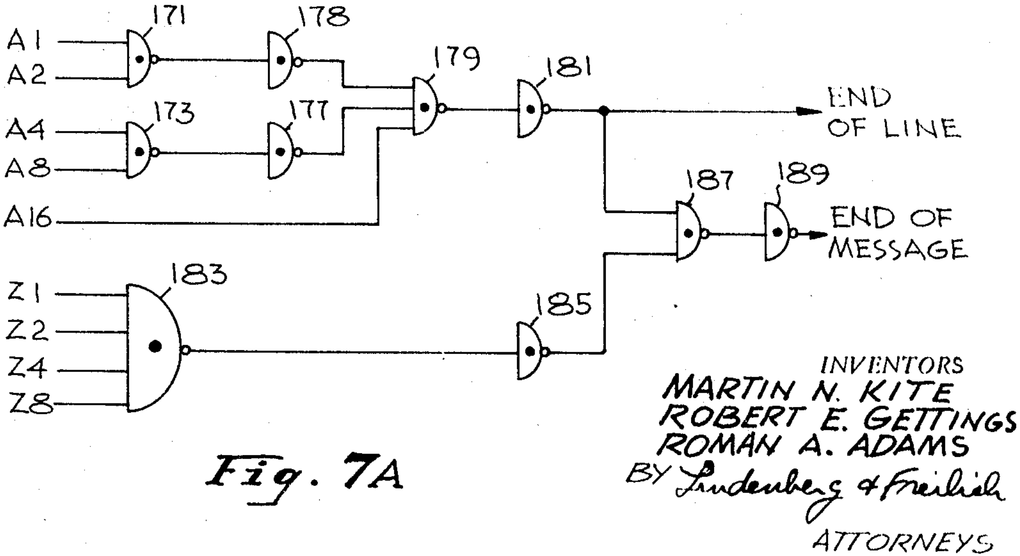
FIG. 7A is a schematic diagram of an end of line or end of message indicator.

FIG. 7A is a schematic diagram of the logic required for obtaining a signal when the cursor has reached the end of a line and another signal when the cursor has reached the end of the message. These signals are used whenever it is desired to terminate a transmission at a given point, i.e., either at the end of a line or the end of a display message. NAND gates 171 and 173 respectively have their inputs connected to receive the A1, A2, A4 and A8 outputs of the cursor X counter 64. These are applied to two inverters respectively 175 and 177. The outputs of the two inverters together with the A16 output of the X counter are applied to a NAND gate 179. Its output is a signal representing the end of a line. This occurs when the X counter has reached its full count. NAND gate 179 output is applied to an inverter 181. The end of a message is sensed when both the X and Y cursor counters reach their full counts. Accordingly, a NAND gate 183 receives the Z1, Z2, Z4 and Z8 outputs of the Y counter. These are applied to an inverter 185. A NAND gate 187 collects the outputs of inverters 181 and 185. This is a signal indicating the end of message and it is applied in turn to a final inverter 189.

MEMORY ADDRESS GENERATOR 67

FIGURE 8

Figure 8:
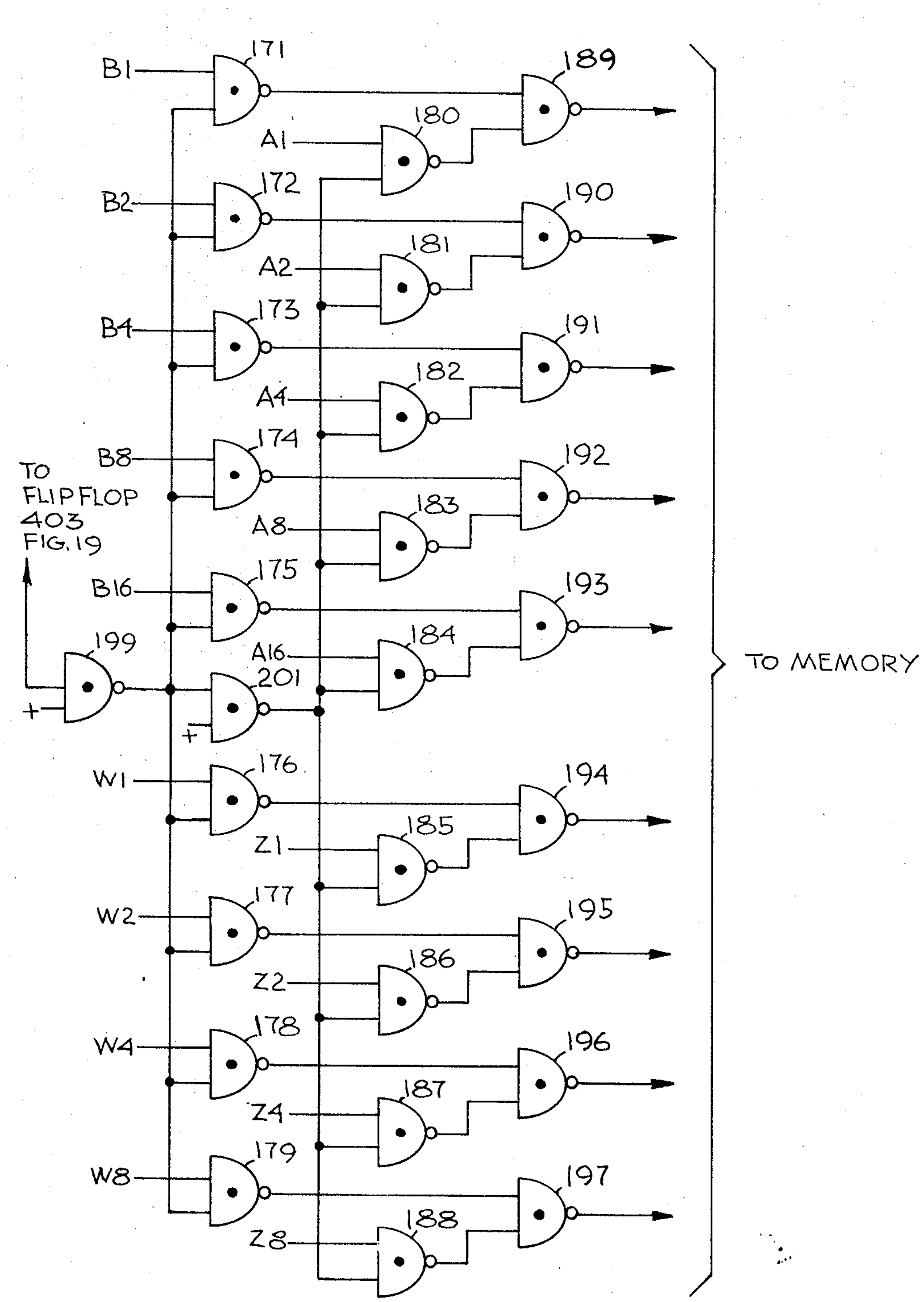
FIG. 8 is a block schematic diagram of the memory address generator.

FIG. 8 is a schematic representation of a memory address generator. By way of illustration, and not to serve as a limitation, a magnetic core memory was employed with an embodiment of this invention which was built and operated.

The memory address generator addresses the memory for the purpose of reading out the data stored therein which is converted into video signals and then displayed. The address generator also provides the address of the locations into which incoming data is stored. The display character and line counters provide the address information for instructing the memory as to the location from which readout is to occur. The cursor X and Y counters provide the address information for instructing the memory as to the location at which data is to be entered. However, write into the memory occurs at an address location provided by the cursor location only when there is an identity in count between the cursor counters and the display counters.

As may be seen in FIG. 8, the memory address generator merely comprises a number of gates which are connected to the outputs of the respective display and cursor counters. The set of gates connected to the display counters are enabled during the process of readout whereby the address presented to the memory is that indicated by the display counters. Alternatively, the gates connected to the cursor counter are enabled when write operation is desired. The outputs from the flip-flops making up the display character counter 24 are respectively applied to each one of the NAND gates 171 through 175. It should be remembered that the counter 24 is a binary counter and its output presents a pulse pattern in binary code representative of one of its 32 counts. The inputs to these NAND gates are designated by the terminology B1, B2, B4, B8 and B16, which corresponds to the outputs shown for the counter 24 in FIG. 6. Similarly, the W1, W2, W4 and W8 outputs of the line counter 26 are respectively applied to the NAND gates 176, 177, 178 and 179.

The five outputs of the cursor character counter 64 are respectively applied to the respective NAND gates 180, 181, 182, 183 and 184. The outputs of the cursor line counter 66 are respectively applied to the respective NAND gates 185, 186, 187 and 188. NAND Gate 189 receives the output of NAND gates 171 and 180. NAND gate 190 receives the output of NAND gates 172 and 181. NAND gate 191 receives the output of NAND gates 173, 182. NAND gate 192 receives the outputs of NAND gates 174 and 183. NAND gate 193 receives the outputs of NAND gates 175 and 184. NAND gate 194 has applied to it the outputs of NAND gates 176 and 185. NAND gate 195 receives the outputs of NAND gates 177 and 186. NAND gate 196 receives the outputs of NAND gates 178 and 187. NAND gate 197 receives the outputs of NAND gates 179 and 188.

Figures 19, 20:
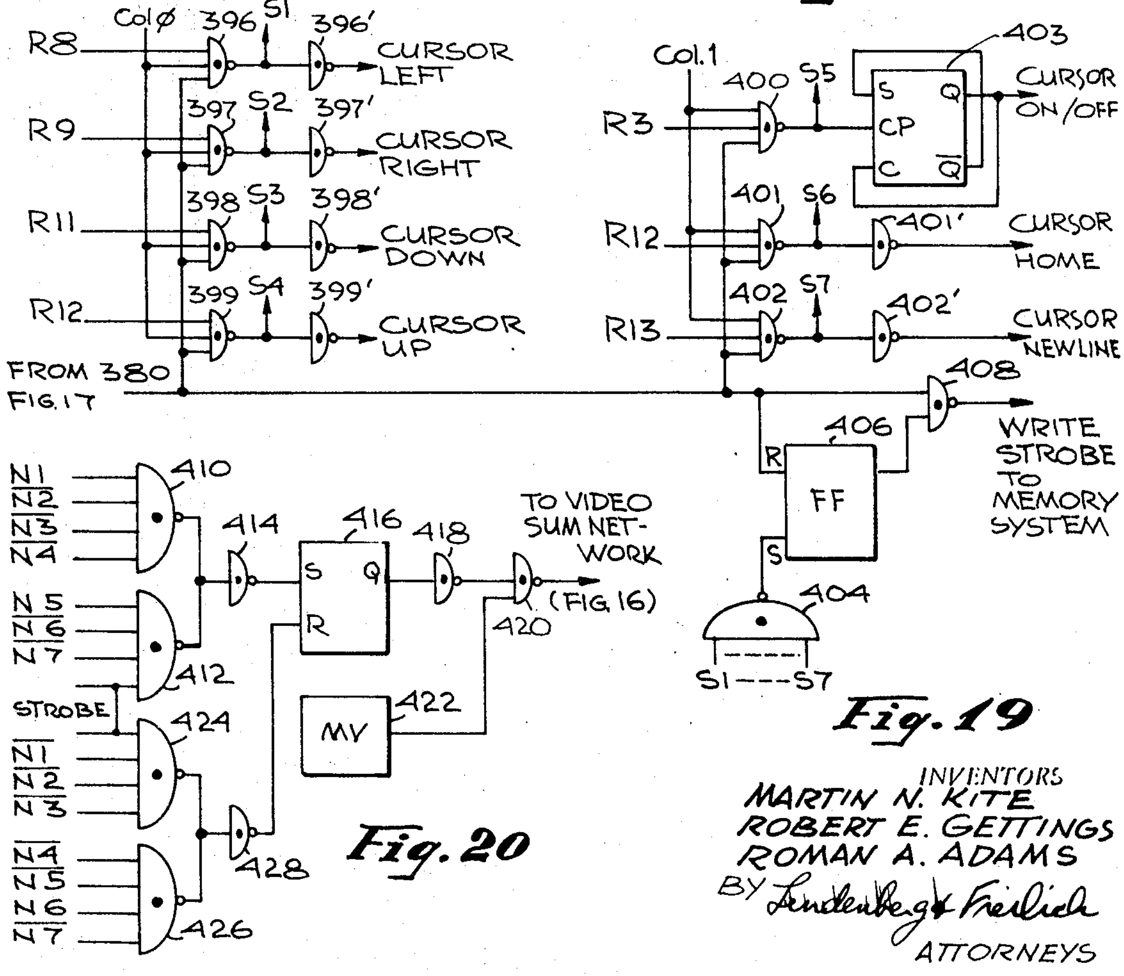
FIG. 20 is a flash control circuit.

An inverter 199 receives a signal from a read-write signal source shown on FIG. 19 which is actuated by the typewriter keyboard or other input data source, when it is desired to write. Otherwise, and normally, a low signal is received from the read-write signal source. Accordingly, the output of inverter 199 is high when in the read mode and is low when in the write mode. The output of inverter 199 is applied to an inverter 201 as well as to all of the NAND gates 171 through 179. The output of inverter 201 is applied to all of the NAND gates 180 through 188.

In the read mode, the output of inverter 199 is high whereby the NAND gates 171 through 179 are all enabled. The high input to inverter 201 results in a low output whereby NAND gates 180 through 188 are not enabled. Thus, the outputs of NAND gates 189 through 197 will be the outputs of NAND gates 171 through 179 or the address data from the display counters. In the WRITE mode of operation, a high signal is applied to the input of inverter 199. This is inverted thus holding NAND gates 171 through 179 disabled. However, the inverter 201 will provide a high or enabling input to the NAND gates 180 through 188. As a result the NAND gates 189 through 197 will provide an address to the memory which constitutes the count outputs of the two cursor counters.

The memory which is to be employed with this invention may be any digital storage-type memory. One that is preferred is the well-known magnetic core memory. The operations of addressing such a memory, entering data for storage and addressing such memory for readout and reading out the stored data are well known and accordingly need not be discussed here.

OUTPUT REGISTER 42

FIGURE 9

Figure 9:
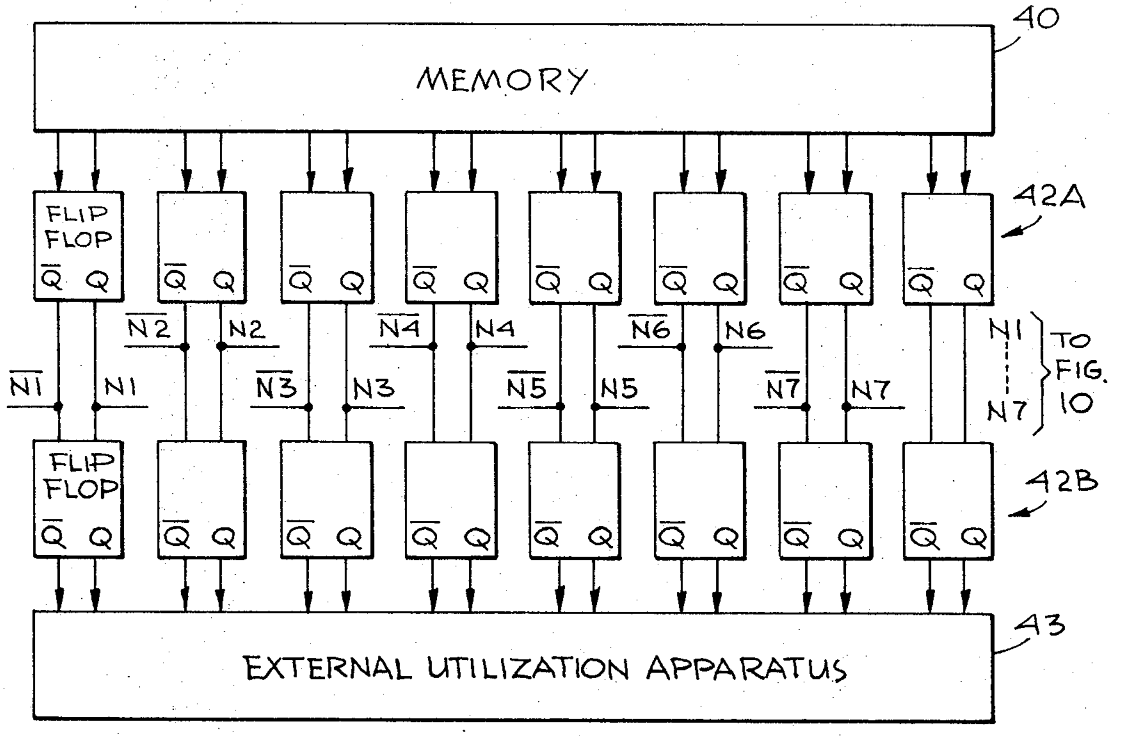
FIG. 9 is a block diagram of an output register.

FIG. 9 is a block diagram illustrating the memory output register 42. In response to readout signals the memory 40 enters the seven bits of the alpha-numeric code plus one parity bit from the addressed location into the register 42A. This register contains 8 flip-flop stages. The pattern of the outputs of the flip-flop stages represents the code. The output from the first seven flip-flops of the register 42A are respectively designated from $\overline{N1}$, N1 to $\overline{N7}$, N7. The eighth parity bit is not used here. The second register 42A assumes the identical state and therefore the data content of the first register 42. The second register is used for transferring the data stored in the memory to an external utilization apparatus 43, which may be an external printer, a transmitter, tape punch apparatus, etc.

Table I as shown below shows the rationale of the conversion from the binary code representation which is stored in memory to a character which is displayed on the monitor tube. The bits of the alpha-numeric code are designated from N1 through N7. Bits N1 through N4 are used to select a particular column. To illustrate this, let us assume that the first four bits, N1 through N4 of the binary character are 0110. Let us further assume that the last three bits of the character are 011. The 0110 bits select the sixth row and the 011 bits select the character 60 at the intersection of the selected row and column.

The zero & one column of the table illustrate various functions which may be selected to be performed by the apparatus. These are not displayed. The sixth and seventh columns are spare columns which can be used subsequently if desired for increasing either the number of characters which are displayed or the functions which can be carried out.

DATA DECODER 44

FIGURE 10

Figure 10A:
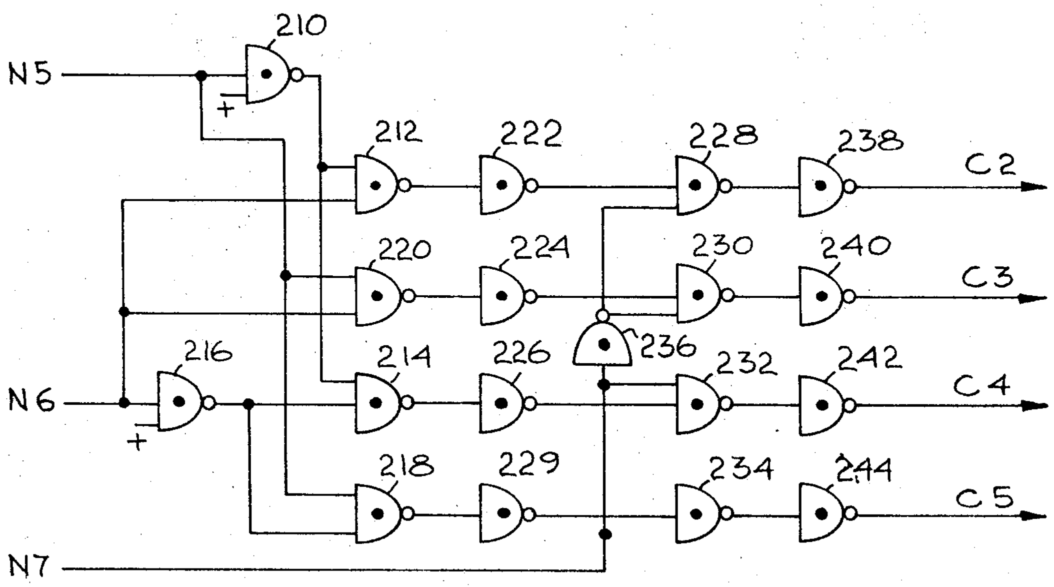
FIGS. 10A, 10B are a schematic diagram of a data decoder.
Figure 10B:
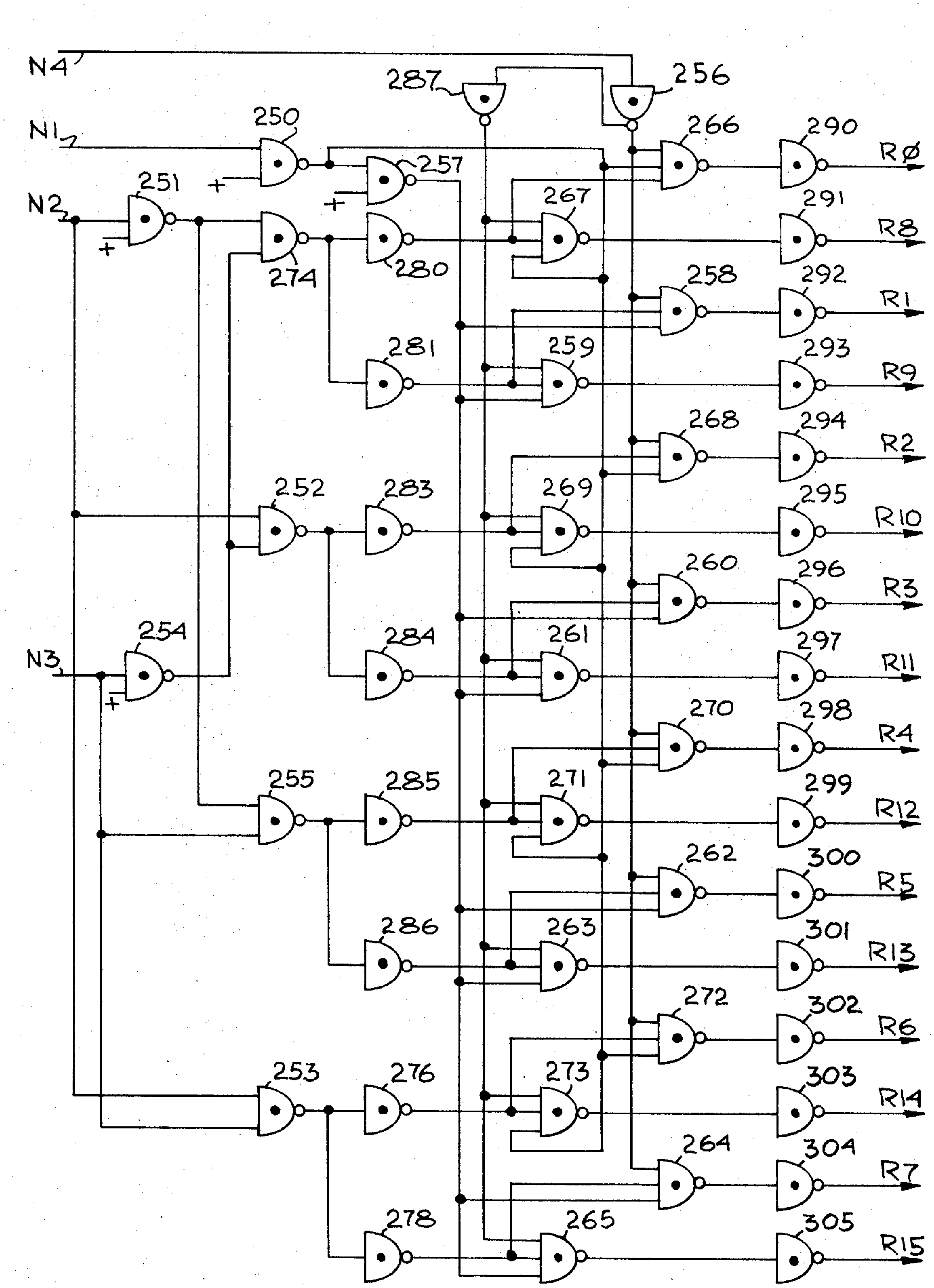

FIG. 10 is a schematic diagram illustrating how the alpha-numeric code in the output register 42 is converted into column and row selecting signals which can be applied to a character generator for the purpose of selecting the proper character to be displayed. The "function codes" are recognized by other apparatus before entering the memory and do not pass through the decoder 44 which is shown in FIG. 10.

The input to the decoder comprises the signals from N1 through N7 which appear at the output of the line register 42. The last three bits of data in the register 42A shown in FIG. 9 are used to select one of the columns 2, 3, 4 or 5, shown in

TABLE I

| Bits | | | | | 0 | 1 | 2 | 3 | 4 | 5 | 6 | 7 |
|---|---|---|---|---|---|---|---|---|---|---|---|---|
| N7 → | | | | | 0 | 0 | 0 | 0 | 1 | 1 | 1 | 1 |
| N6 → | | | | | 0 | 0 | 1 | 1 | 0 | 0 | 1 | 1 |
| N5 → | | | | | 0 | 1 | 0 | 1 | 0 | 1 | 0 | 1 |
| N4 ↓ | N3 ↓ | N2 ↓ | N1 ↓ | Column → Row ↓ | 0 | 1 | 2 | 3 | 4 | 5 | 6 | 7 |
| 0 | 0 | 0 | 0 | 0 | NUL | | SP | 0 | | P | | |
| 0 | 0 | 0 | 1 | 1 | | FLASH | ! | 1 | A | Q | | |
| 0 | 0 | 1 | 0 | 2 | | DOWN SHIFT | " | 2 | B | R | | |
| 0 | 0 | 1 | 1 | 3 | | CURSOR ON/OFF | # | 3 | C | S | | |
| 0 | 1 | 0 | 0 | 4 | | UP SHIFT | $ | 4 | D | T | | |
| 0 | 1 | 0 | 1 | 5 | | | % | 5 | E | U | | |
| 0 | 1 | 1 | 0 | 6 | | | & | 6 | F | V | | |
| 0 | 1 | 1 | 1 | 7 | | | ' | 7 | G | W | | |
| 1 | 0 | 0 | 0 | 8 | CURSOR LEFT | | ( | 8 | H | X | | |
| 1 | 0 | 0 | 1 | 9 | CURSOR RIGHT | | ) | 9 | I | Y | | |
| 1 | 0 | 1 | 0 | 10 | LINE FEED | | * | : | J | Z | | |
| 1 | 0 | 1 | 1 | 11 | CURSOR DOWN | | + | ; | K | [ | | |
| 1 | 1 | 0 | 0 | 12 | CURSOR UP | CURSOR HOME | , | < | L | ~ | | |
| 1 | 1 | 0 | 1 | 13 | CARRIAGE RETURN | CURSOR NEW LINE | - | = | M | ] | | |
| 1 | 1 | 1 | 0 | 14 | | | . | > | N | ^ | | |
| 1 | 1 | 1 | 1 | 15 | | | / | ? | O | — | | |

FIG. 1. The N5 bit is applied to a NAND gate 210, whose output is connected to AND gates 212 and 214. The N6 output of the register 42 is connected to a NAND gate 216, whose output is connected to a NAND gate 218. N5 is also connected to the second input to NAND gate 218 and to another NAND gate 220. The N6 signal is also applied to NAND gates 212 and 220. The outputs of NAND gates 212, 220, 214 and 218 are respectively applied to NAND gates 222, 224, 226 and 228. These NAND gates merely act as inverters. Their outputs are applied to the respective NAND gates 228, 230, 232, and 234. The N7 bit is applied as the input to NAND gates 234 and 232 and also to a NAND gate 236 which acts as an inverter. The output of this NAND gate is applied to the second input to NAND gates 228 and 230. The outputs of NAND gates 228, 230, 232 and 234, are all applied to the respective NAND gates 238, 240, 242 and 244. These NAND gates act as inverters. The output of these NAND gates are respectively designated as P8, P6, P10 and P12. These outputs select columns 2 through 5 respectively.

Referring to Table I, it will be seen that column 3 is selected when the N5, N6 and N7 bits respectively have the values "110." If N5 and N6 are high, then the outputs of the NAND gates 210 and 216 are low. These low outputs are applied to NAND gates 212, 214 and 218 and blocks these NAND gates. The outputs of NAND gates 212 and 214 and 218 are all high. The inputs to NAND gate 220 are both high and therefore its output is low. This is inverted by NAND gate 224. Therefore, NAND gate 230 has a high input from NAND gate 224 and also has a high input from the inverter 236, since N7 is low. Thus, the output of NAND gate 230 is low which is inverted by inverter 240 to provide an enabling C3 or high signal. The other outputs respectively C2, C4 and C5 from inverters 238, 242 and 244 are all low.

For row selection, the N1 through N4 signals are applied to a decoding matrix. N1 is applied to inverting NAND gate 250. N2 is applied to an inverting NAND gate 251 and also to NAND gates 252 and 253. N3 is applied to inverting NAND gate 254 and also to NAND gates 255 and 253. N4 is applied to inverting NAND gate 256. The output of NAND gate 250 is applied through an inverting NAND gate 257 whose output is thereafter applied to NAND gates 258, 259, 260, 261, 262, 263, 264, and 265. The output of NAND gate 250 is also applied to NAND gates 266, 267, 268, 269, 270, 271, 272, and 273.

The output of NAND gate 251 is applied to NAND gate 274, and to 255. The output of NAND gate 254 is applied to NAND gates 252 and 274. The output of NAND gate 253 is applied to NAND gate 276 and 278. The output of NAND gate 274 is applied to a NAND gate 280 and 281. The NAND gate 280 output is applied to NAND gate 267. NAND gate 281 output is applied to NAND gate 259. NAND gate 276 output is applied to NAND gate 273 and NAND gate 278 is applied to NAND gate 265.

NAND gate 252 output is applied to NAND gate 283 and 284 whose respective outputs are applied to NAND gates 269 and 261. The output of NAND gate 255 is applied to the NAND gates 285 and 286 whose outputs are respectively applied to NAND gates 271 and 263.

The output of NAND gate 256 is applied to NAND gates 266, 258, 268, 260, 270, 262, 272 and 264. The output of NAND gate 256 is also applied to a NAND gate 287, whose output is applied to NAND gates 267, 259, 269, 261, 271, 263, 273 and 265. Inverting NAND gates 290 through 305 receive the outputs of NAND gates 266, 267, 258, 259, 268, 269, 260, 261, 270, 271, 262, 263, 272, 273, 264, and 265. The outputs of the inverters 290 through 305 are designated by the symbols RO through R15, corresponding to the rows in Table I.

To illustrate how the row decoder portion works, assume that the binary character 0110 corresponding to binary bits N2 and N3 being high and N1 and N4 being low are applied to the row decoder. The N4 low input to NAND gate 256 is inverted and appears as a high signal at its output. This high signal is applied to the NAND gates 266, 258, 268, 260, 270, 262, 272, 264. The high output of NAND gate 256 is inverted by NAND gate 287 and appears as a low signal input to the NAND gates 267, 259, 269, 261, 271, 263, 273 and 265. Thus, these NAND gates are deactivated. The N2 high input to inverter 251 is inverted and is applied as a low input to NAND gates 274 and 255 deactivating these. The high N3 input to NAND gate 254 is inverted and is applied to NAND gates 252 and 274 inactivating these. The output of NAND gate 253 which receives the high N2 and N3 inputs is low. Inverter NAND gate 276 inverts the low output of NAND gate 253 and applies it as a high input to a NAND gate 272. A second input to NAND gate 272 is the high output of inverter 256. A third input to NAND gate 272 is the high output of inverter 250 (N1 being low.) Therefore the output of NAND gate 272 is low. All of the other NAND gates in the decoder have at least one of their inputs high and the other of their inputs low and thus their outputs will remain high. Only NAND gate 272 has three high inputs applied thereto and thus only its output goes low in response to the application of the N1 through N4 signals. The inverter 302 inverts this to a high output. Thus the only output terminal of the row decoder which is high is the R6 output terminal.

Figures 11, 12, 13, 14:
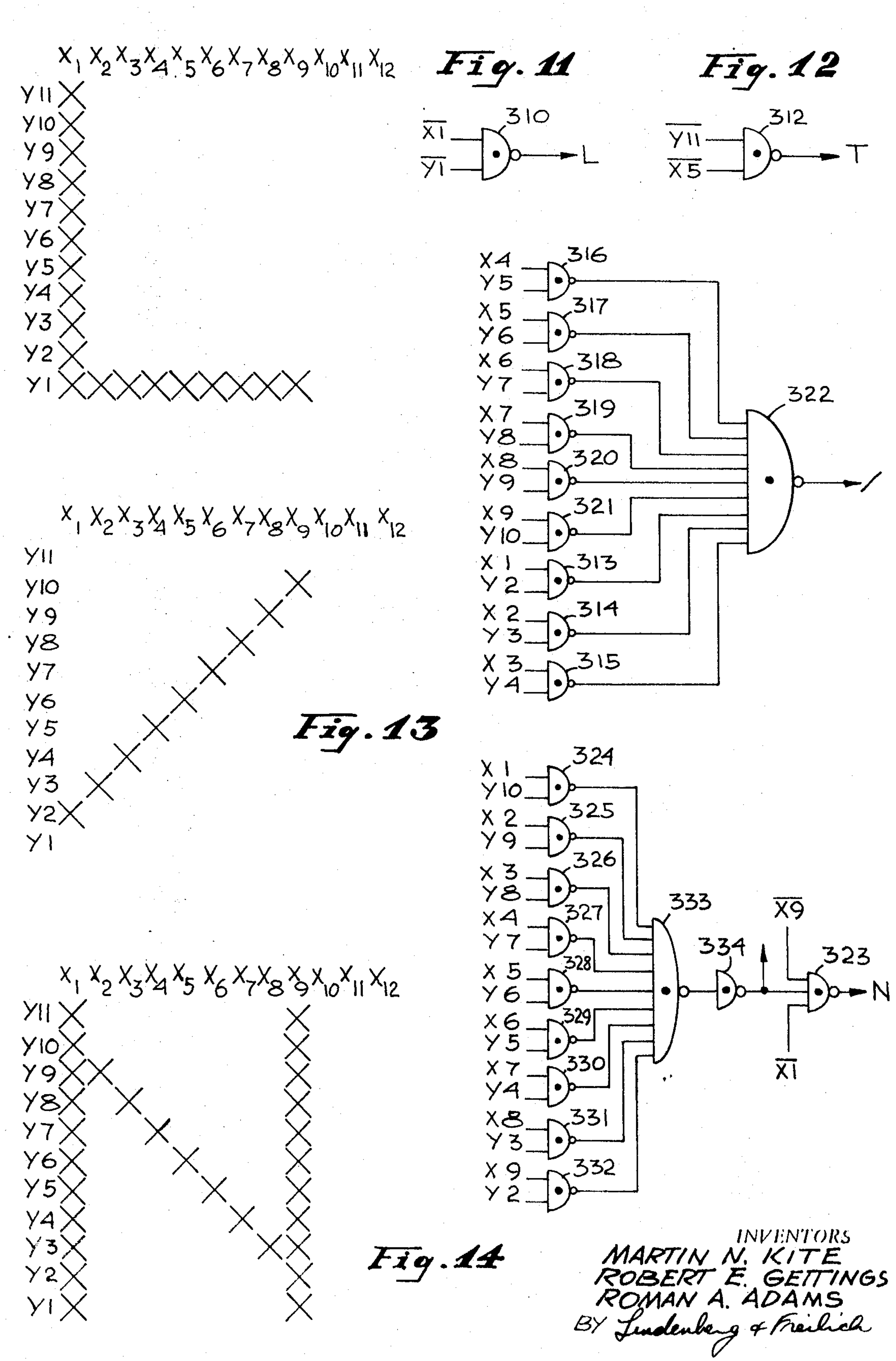
FIGS. 11, 12, 13 and 14 illustrate dot patterns and associated logic representative of the character generator.

It should now be clear how the N1 through N7 outputs from the register 42, can be used to spell out or select a particular column and a particular row of Table I, whereby a particular character or symbol is specified. The arrangement whereby the column and row signal outputs of FIG. 10, together with other signals are used by the character generator to generate the selected character or symbol is shown in FIG. 11.

CHARACTER GENERATOR

FIGURES 11, 12, 13 & 14

It will be recalled that each character or symbol which is to be displayed is composed of a plurality of dots arranged to represent the character or symbol. This may be seen in FIG. 5. Effectively, what is shown there is a matrix arrangement comprising rows Y1 through Y11 and columns X1 through X10. If one considers the output counts of the X and Y matrix counters shown in FIG. 4, as addresses of these dots and one combines these addresses using logical gates, one can generate a train of signals which when displayed on a CRT face, will give the appearance of a character. Thus, if it is desired to generate a signal upon the occurrence of Y11 and X5, then an AND gate (or a NAND gate) has these two output counts applied to its input and an output signal from this gate will occur only in the presence of both of the inputs. Carrying this further, to demonstrate how signals, which may be used to represent for example the left side of the A character shown in FIG. 5 may be generated, all one has to do is to arrange gates which will emit signals in the presence of the following pairs of signals Y1, X1–Y2, X1–Y3, X1–Y4, X1–Y5, X1–Y6, X1–Y7, X1–etc. These signals may be applied to the cathode-ray tube brightness control grid, while sweep signals are applied to the deflectors of the cathode-ray tube.

From the foregoing, it should be clear that in order to use the dot pattern construction for generating dot signals in a sequence which when displayed will represent a desired character, in the present invention, outputs from the X and Y matrix counters are combined. These outputs produce a train of signals which when displayed represent a character or symbol. The time of the occurrence of such a display across the face of the cathode-ray tube is determined by the X and Y display character counters. The outputs of these counters are used to generate an address for reading the character out of the core memory which is immediately displayed. Since the counters are driven in response to the same horizontal and vertical sync signals which are applied to the cathode-ray tube used for display, effectively, the displays occur at a location on the face of the cathode-ray tube which corresponds to the location of a character in the memory.

In accordance with this invention, since a study of the formation of the characters and symbols which are used, shows that the block characters have redundant portions, logic may be employed for using these redundant portions for more than one character. Thus, the letter P is made up of a vertical bar on the left to which there is joined at the upper portion a half of a small circle. One may use the logic which generates the P with a small bit of additional logic to generate an R or a B.

Table I shows the symbols and characters desired to be generated. If one draws these out in dot pattern from in an arrangement such as is shown in FIG. 5, a set of gates connected to the indicated outputs of the X and Y matrix counters as determined by the darkened areas of the drawing and as modified by the logic for eliminating redundancy, can produce the required pulse stream for representing every one of the characters. The ones of the characters which are permitted to be represented are determined by the row and column signals which are generated in response to the binary character signals read out from the memory.

Referring now to FIG. 11, there may be seen the dot pattern of the letter L and the logic required for obtaining the required video signals from the outputs of the X and Y matrix counters. Referring back to FIG. 4, it will be seen that the $\overline{X1}$ signal is low during the first count of the counter and thereafter is high. The $\overline{Y1}$ signal is high except for the 11th count of the counter. Now since for every line counter state there will be a complete cycle of character counter states, then, NAND gate 310 to which the $\overline{X1}$ and $\overline{Y1}$ inputs are applied will provide an output which is high for the states X1, Y11 through Y1, and during all of the Y1 states. The output of the NAND gate 310 will be low thereafter. Thus the output of NAND gate 310 is a sequence of pulse signals which are spaced so that when they are displayed in the same sequence and over the same interval as they are generated, they will represent the letter L.

As will become more clear with subsequently shown examples of characters desired to be displayed, by using the "not" functions derived from the counters as shown in FIG. 4, the cathode-ray tube displays an entire column or a row corresponding to the location of the selected function in the dot matrix. Thus, as shown in FIG. 11, the $\overline{X1}$ and $\overline{Y1}$ selections have the effect of illuminating the column designated X1 and the row designated Y1.

When the function selected is the inverted "not" function, then the dot matrix is illuminated only at the specific address which is selected (i.e. X1, Y1 would illuminate only that spot). It should be apparent that the inverted function of $\overline{X1}$ and $\overline{Y1}$ or $\overline{X}$ and $\overline{Y}$ are the signals obtained by applying $\overline{X1}$ to an inverter and $\overline{Y1}$ to an inverter. The outputs of these inverters are low except when the respective counters are in their X1 and Y1 states. Therefore, when these two count outputs are applied to a NAND gate, the NAND gate output is high except in the presence of the two inputs at which time it becomes low. This is used in the logic of the character generator to obtain illumination on the face of the cathode-ray tube at a specific address within the dot matrix represented by the output selected from the counters.

From the foregoing it is believed clear that if it is desired, for example, to enable the display of the letter T on the CRT face, one would select the $\overline{Y11}$ and $\overline{X5}$ output from the counters and apply them to NAND gate 312 as shown in FIG. 12. The $\overline{Y11}$ selection causes the illumination of the entire Y11 row in the dot matrix. The $\overline{X5}$ selection causes the illumination of the entire X5 column in the dot matrix.

FIG. 13 further exemplifies how the outputs of the two counters shown in FIG. 4 can be used to produce a desired pattern in the dot matrix. It is desired to produce a diagonal extending upward from left to right. The matrix pattern is drawn and it is seen that only a single spot occurs at each of the addresses which can be specified as X1, Y2,–X2, Y3, all the way to X9, Y10. The NAND gates 313 through 320 each have as their two inputs respectively from X1, Y2 to X9, Y10.

The outputs of these respective NAND gates are applied to a succeeding NAND gate 322. Its output comprises a train of pulse signals which occur timed so that they will produce the display shown in FIG. 13 on the face of a CRT. This will be readily understood when it is appreciated that each one of the NAND gates 313 through 321 has its respective outputs high until both of its respective inputs become high at which time its output becomes low. Accordingly, the output of NAND gate 322, for each of the Y1 through Y10 counts will go high once upon the occurrence of the associated X1 through X9 counts.

FIG. 14 shows the letter N constructed in the dot matrix and the address logic required to generate a signal train which will produce the letter N on the CRT. By inspection one can see that the entire X1 column and X9 column must be selected. From the previous discussion, this is done by connecting $\overline{X1}$ and $\overline{X9}$ outputs to a NAND gate 323. For constructing the diagonal of the letter N, the addresses of the dot matrix points must be specified. The X1, Y10 and X9, Y2 addresses are specified in addition to each one of the addresses of the diagonal points because, despite the fact that these addresses are included in the $\overline{X9}$ and $\overline{X1}$ addresses, for other letter formations the diagonal stroke of the letter N is useable. Accordingly, to each one of the NAND gates 324, through 332, there is respectively applied the addresses ranging from X1, Y10, X2, Y9 through X9, Y2. The outputs of the respective NAND gates 324 through 332 are all connected to a NAND gate 333. Its output is connected to an inverter 334. The inverter output is connected to the input of the NAND gate 323.

In operation, the output of each one of the NAND gates 324 through 332 is high except when the two high inputs are present simultaneously at which time these outputs will go low. Accordingly, the output of NAND gate 333 will consist of a pulse train which will go from low to high when each one of the X1, Y10 through X9, Y2 inputs are coincidentally present. NAND gate 334 inverts these pulses. The output of NAND gate 323 will then be high for illuminating columns X1 and X9. In addition, its output will be high upon the coincidence of the X and Y times specified at the inputs to each one of the NAND gates 324 through 332.

The description of FIG. 14 shows how one can combine the "not" functions and the functions derived from the "not" functions for producing a desired display. One can take the output of NAND gate 334 and use this if desired for displaying a diagonal which has an opposite inclination to the diagonal as shown in FIG. 13. It is believed that the foregoing suffices to teach one how to make any desired configuration using a dot matrix.

From the foregoing information, it should be apparent how one can generate a train of signals whereby an E or an F can be represented. Considering first the F, this will comprise an $\overline{X1}$ signal which will cause the X1 column to be illuminated. A $\overline{Y11}$ signal will cause the Y11 row to be illuminated, and a $\overline{Y6}$ signal will cause the Y6 column to be illuminated. All that is required to add a bottom bar to the F to make it into an E is to apply the $\overline{Y1}$ signal to whatever NAND gate is employed for collecting the $\overline{X1}$ and $\overline{Y11}$ signals.

The video signals for an H can be generated by applying $\overline{X1}$, $\overline{X9}$ and $\overline{Y6}$ signals to a NAND gate. These illuminate the first and last columns of the dot matrix and the middle row, respectively to form the H.

An X can be formed by combining the output of NAND gate 334 in FIG. 14, (the middle portion of the letter N) with the output of NAND gate 322 shown in FIG. 13.

From the information provided, it should now be apparent how one can, in accordance with this invention, combine the outputs of the X and Y matrix counters for the purpose of generating a train of video signals which when properly displayed will show a desired character.

VIDEO SELECTOR 30

FIGURES 15 & 16

Since the X and Y matrix counters are continually running, it is necessary to select from the various gate arrangements of the type shown, those outputs which will provide the video signal trains desired in accordance with the row and column signals derived from the data signals read from the memory. An arrangement for doing is shown in FIG. 15.

Figure 15:
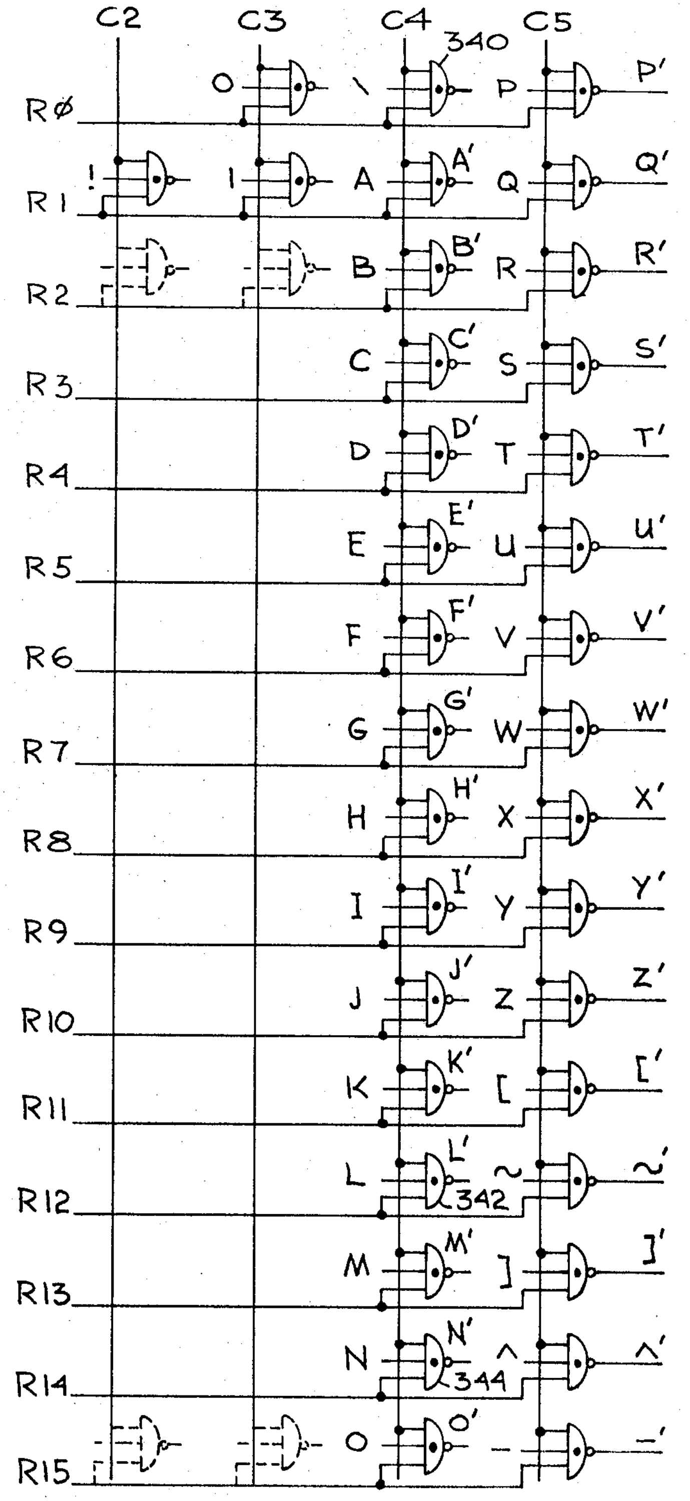
FIGS. 15 and 16 are schematic diagrams of the video selector.

There is shown in FIG. 15 respective conductors R0 through R15 corresponding to rows 0 through 15 in Table I, and conductors C2, C3, C4 and C5 corresponding to columns 2, 3, 4 and 5 in Table I. The respective row and column conductors are connected to the respective row and column outputs shown in FIG. 10. A NAND gate is provided at each junction of a row and column conductor. Thus, there is a NAND gate for each one of the functions specified in the table in columns 2, 3, 4 and 5. Only those functions in the last two columns C4 and C5 are shown in order to maintain simplicity in the drawing. The presence of the NAND gates which are not shown at the junctions of the row and column conductors will be understood. Each one of the NAND gates, which are designated by the generic reference numeral 340, has three inputs. One of these is from the column bus, the second is from the row bus and the third is from the output of one of the output gates of the character generator. Thus, NAND gate 342 has one input connected to the output of NAND gate 310 shown in FIG. 11. The second input is connected to the C4 column conductor and a third conductor is connected to the R13 row conductor. NAND gate 344 has one input connected to the output of NAND gate 323 shown in FIG. 14, a second input is connected to column conductor C4 and the third input is connected to row conductor R12.

The NAND gates 340 have their inputs from the respective character generator output gates designated by the character represented by the received signals. The outputs of these NAND gates 340 are designated by the prime of their inputs. Thus, the input to NAND gate 344 is "N" its output is designated as "N′."

It should now be apparent how a character readout of the memory selects video signals from the character generator which represent that character when displayed on a CRT. The character or data signals read from the memory are converted into row and column signals and then are applied to the NAND row and column array shown in FIG. 15 to select one of those NAND gates.

Figure 16:
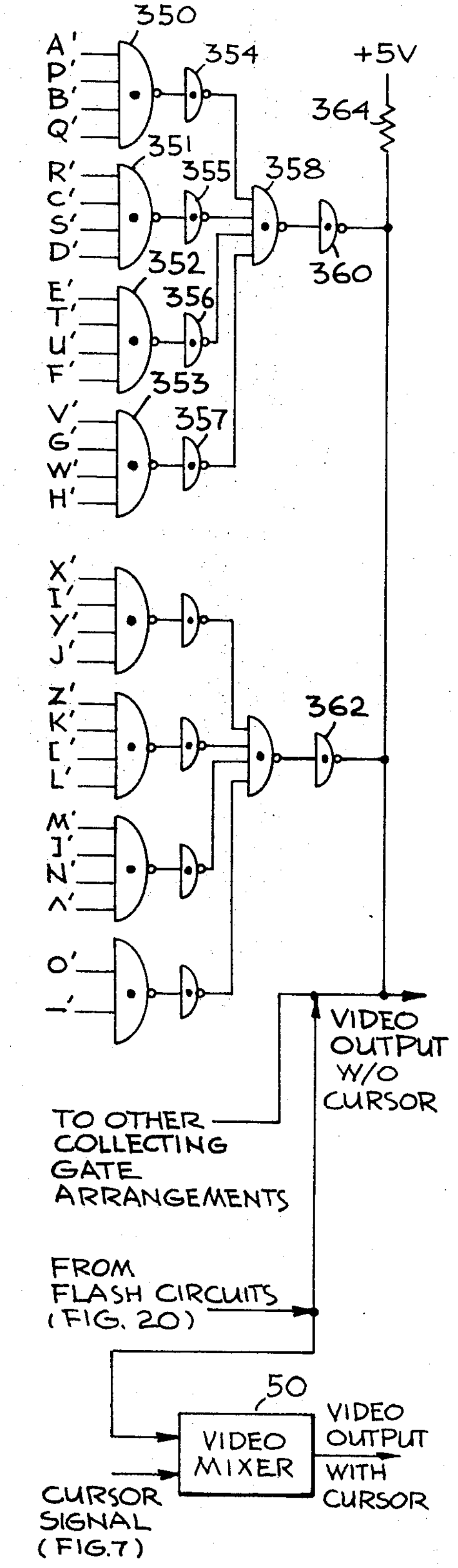

It is now necessary to collect all of the outputs of the array of NAND gates shown in FIG. 15 and to convert them down to a single line video output for application to a cathode-ray tube. This is done in the manner shown in FIG. 16. A group of four input NAND gates respectively 350, 351, 352, 353 have a different one of their inputs connected to the outputs from the NAND gates 340 as shown in FIG. 15. Thus, NAND gate 350 has its inputs connected to the A′, P′, B′ and Q′ outputs of the NAND gates. The outputs of each one of the NAND gates 350 through 353 is respectively connected to an inverter 354, 355, 356 and 357. The output of each one of these inverters is connected to another NAND gate 358. The output of this NAND gate is connected to another inverter 360.

A second arrangement similar to the one just described is employed for collecting other outputs of the NAND gates 340. This arrangement has an output inverter 362, which is connected to the output of NAND gate 360. These outputs are connecting through a summing resistor 364 to a source of potential.

As many other of these collecting gate arrangements as may be required are used, and their outputs are connected in a summing arrangement similar to the one shown for NAND gates 360 and 362. The summed output constitutes the video output.

SUMMARY

Reviewing now the operation of the display system, as described thus far, the display character counter 24 and the display line counter 26 provide an address which is used both for positioning a character on the face of the cathode-ray tube and for reading a character out of the core memory. The character readout of the core memory is entered into an output line register where it is held for the purpose of being decoded (converted into a row and column signal). The decoded signal is then applied to a video selector (row and column matrix shown in FIG. 15) which selects the ones of the video signals generated by the character generator which correspond to the character read from the memory. The output of the video selector is applied to a mixer circuit 50, if it is also desired to display the cursor on the CRT face. Otherwise, the video selector output may be directly applied to the face of the CRT.

The timing problem is solved by the manner in which the display and matrix counters are driven. The display character counter has its count advanced once for every character to be displayed. The X matrix counter has its count advanced 12 times for every character to be displayed. The display line counter has its count advanced once for every line of characters which are displayed. The Y matrix counter has its count advanced 14 times corresponding to 14 video line for each line of characters to be displayed. Logic gates select from the X and Y matrix counters the addresses within a dot matrix which are to be illuminated whereby a character is displayed. The character displayed is the one selected by the address represented by the count outputs of the display character and line counters.

INTERFACE CIRCUITRY–60

Figures 17, 18:
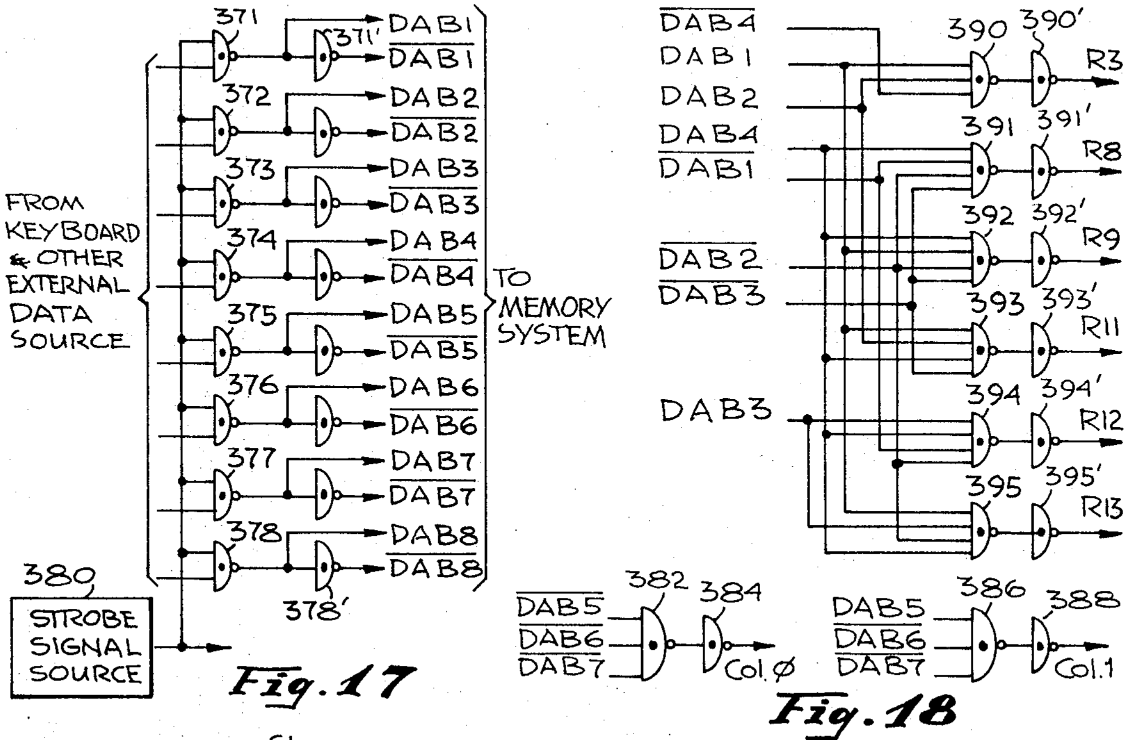
FIGS. 17, 18 and 19 are schematic diagrams of interface circuits.

FIGS. 17, 18 and 19 are circuit schematic diagrams of the interface circuitry which is employed. Referring back to FIG. 2, it will be seen that keyboard 14 provides eight data lines and a strobe signals. The output of the interface circuitry comprises the cursor control signals as shown in column 0 and column 1 of Table 1. The interface circuitry serves the function of receiving the data signals for example, from either a keyboard or a tape reader, routing them to a decoder to determine whether these are the control signals of the type indicated, or whether these are character representative signals which are also routed to the memory system. FIG. 17 shows the eight NAND gates respectively 371 through 378 to which the seven bits representing data and a parity bit are applied. The outputs from these eight gates are designated respectively as DAB1 through DAB8. These eight gates are enabled only in the presence of an output from a strobe signal source, 380, which is applied to all of these gates. The outputs from the respective gates 371 through 378 are applied to inverter gates 371′ to 378′. The outputs from the respective eight inverter gates are respectively labeled $\overline{DAB1}$ through $\overline{DAB8}$.

An incoming binary word which comprises the output from the gates shown in FIG. 17 is not entered into the core memory unless the keyboard 14 or tape reader 12 signals to the display control apparatus that it should be in the write mode. As described previously, the system is normally in the read mode. Accordingly, unless the apparatus is placed in the write mode the binary word which appears at the output of the gates shown in FIGS. 17 is not entered into the core memory, however, it is applied to both the core memory input registers (not shown) and also to the decoding circuits. The decoding circuits operate in the same manner as was described previously in connection with selection of character video signals. The first four bits of a word are converted into a row selecting signal and the next three bits of a word are converted into a column selecting signal. These row and column selecting signals are then applied to a row and column logic array for energizing a single gate therein whose output represents the selected function. The arrangement of logic gates to accomplish this is shown in FIGS. 18 and 19. Only a few of the functions specified in columns 0 and 1, and more particularly those functions which have to do with controlling the cursor, are shown by way of example. However, from the description provided it will become clear how this arrangement can be extended to select any desired number of functions.

FIGURE 18

In FIG. 18, the logical arrangement is shown for selecting column 0 and column 1 and rows R3, R8, R9, R11, R12 and R13. To select column 0, all that is required is to sense the presence of three 0's in the fifth, sixth and seventh binary bit positions. Accordingly, when $\overline{DAB5}$, $\overline{DAB6}$, and $\overline{DAB7}$ are all present, the output of a NAND gate 382 goes low. This NAND gate output is applied to an inverter 384. Thus a high 37 column 0" signal is present when $\overline{DAB5}$, $\overline{DAB6}$, and $\overline{DAB7}$ inputs are all high.

To select column 1, one must sense the presence of signals "100"in the respective fifth, sixth and seventh binary bit positions. This is represented by the DAB5, $\overline{DAB6}$ and $\overline{DAB7}$ inputs to a NAND gate 386. The output of this NAND gate is applied to an inverter 388 which is a high signal, when the three inputs of NAND gate 386 are present simultaneously.

NAND gates 390, 391, 392, 393, 394, and 395 are respectively used for selecting rows 3, 8, 9, 11, 12 and 13. Row 3 is selected when the first four bits of a binary word are 1100. By inspection, 11 in the first and second place and 0 in the fourth place are a unique combination and therefore one need only look for selecting row 3. Thus gate 390 has DAB1, DAB2, and $\overline{DAB4}$ applied to its input. The other inputs to the NAND gates 391 through 395 are as specified in Table I. Thus to select row 8 one requires $\overline{DAB1}$, $\overline{DAB2}$, $\overline{DAB3}$, and DAB4 corresponding to 0001 in the first four bit places of a word.

Each one of the NAND gates 390 through 395 is followed by an inverter 390′ through 395′.

FIGURE 19

FIG. 19 shows the further logic which in response to the row and column signals generated by the logic in FIG. 18 produces the output signals which instruct the cursor counters how to operate. By way of example, column 0 is shown as having four NAND gates respectively 396, 397, 398, and 399. The outputs from each one of these NAND gates is applied to the respective inverters 396′, 397′, 398′, and 399′. The column 0 output from the inverter 384, shown in FIG. 18, is applied to a bus labeled as column 0 which is connected to all of the NAND gates 396 through 399. The respective row 8, row 9, row 11 and row 12 outputs of the NAND gate circuits shown in FIG. 18 are applied to the respective NAND gates 396 through 399. Therefore, in the presence of a row 8, column 0 signal, and further in the presence of a strobe signal from the signal source 380, the output of NAND gate 396 goes from high to low whereupon the inverter 396′ converts this to a high signal.

Column 1 output from inverter 388 (FIG. 18) is applied to a bus which is connected to NAND gates 400, 401, and 402. The output of NAND gate 400 is applied as a clock input to a flip-flop 403. The output of NAND gates 401 and 402 are respectively applied to converters 401′ and 402′.

The control signals which are the outputs of the inverters 396′ through 399′ and 401′ and 402′ are respectively designated as cursor left, cursor right, cursor down, cursor up, cursor home and cursor new line. It will be recalled that the line and character cursor counters are reversible counters and are also cyclic counters. The position of the cursor is determined by the address provided by the outputs from these counters. The cursor left signal and the cursor right signal respectively cause the cursor character counter to either decrease its count by one or to increase its count by one whereby the cursor is moved one character position to the left or one character position to the right of its location at the time the cursor left or cursor right key is pressed on the keyboard. The cursor down and cursor up signals are applied to the cursor line counter for the purpose of causing the cursor to increase one count or to decrease one count whereby the cursor shifts its position either up one line or down one line from the position it is occupying. Techniques for advancing a counter by a count or reducing the count of a counter by a count, and also for forcing a counter to assume a desired count state are well known and therefore will not be described here.

The cursor home signal resets the cursor line and character counters to their initial count state thereby sending the cursor to the upper left-hand corner of the display tube. The cursor new-line signal causes the cursor line counter to increase its count by one and resets the cursor character counter to its initial count condition whereupon the cursor appears at the commencement of the next line.

Finally, the cursor on/off signal either enables the cursor to be seen or removes the cursor from the display. The flip-flop 403 is set upon an output being received from the NAND gate 400 whereby its Q output goes high. The next output from the NAND gate 400 causes the flip-flop to reset. In this way the cursor may be successively triggered on and off by successive operation of the cursor on/off key on a keyboard.

In the presence of a control signal of the type shown in FIG. 19, it is not desired to have a write operation occur. Obviously, it is not desired to enter the binary word representing a control operation into the memory. A NAND gate 404, senses the presence of any one of the control signals from the outputs of the NAND gates 396 through 402 (designated as "S" signals). Its output is used to set a flip-flop 406. The reset output of this flip-flop enables a NAND gate 408 to pass strobe pulses to the memory. These are designated as write strobe pulses. Accordingly, the write strobe pulses are inhibited whenever a control signal is present. The next entry from the keyboard, which is accomplished by a strobe signal, resets the flip-flop 406, whereupon the NAND gate 408 is enabled to pass the write strobe signal.

The memory system designated in FIG. 2 as core memory 40, is a commercially purchasable magnetic core memory which includes suitable input registers for receiving and holding data for the purpose of entry into the memory at an address, here supplied by the display character counter and display line counter. As previously indicated, the entry into the memory does not occur until the address of the display character counter and display line counter coincides with the address of the cursor character counter and cursor line counter.

FLASH CONTROL 46

FIG. 20 is a block schematic diagram of the circuit arrangement for "flash control." By flash control is meant that a particular word will flicker or flash while being displayed on the face of the CRT. This calls attention to it and what follows.

From Table I it may be seen that the flash code is 1000100. This flash code is entered into the memory in place of a space code (0010000) and prior to the word which is desired to be flashed. The circuitry operates to apply a flashing signal to each character of the word. The next space code which occurs is detected and serves to turn off the flash code signal.

Two NAND gates respectively 410 and 412 are used to detect the flash code which is 1000100. When entered into the register at the output of the memory, as shown on FIG. 9, the signals corresponding thereto are N1, $\overline{N2}$, $\overline{N3}$, $\overline{N4}$, N5, $\overline{N6}$ and $\overline{N7}$.

When all of these inputs are simultaneously present, then the output from the two NAND gates is low. This is applied to an inverter 414. The output of the inverter is applied to a flip-flop 416 to drive it to its set state. The set output of the flip-flop 416 is applied to an inverter 418 to enable a NAND gate 420. The NAND gate 420 when enabled can pass the output of a multivibrator 422. This consists of a train of pulses at some suitable audio frequency. The output of NAND gate 420 is then applied to the video sum network shown in FIG. 16 where it is added to the train of video signals to cause them to flicker.

The space code is shown in Table I as 0000010. This corresponds to $\overline{N1}$, $\overline{N2}$, $\overline{N3}$, $\overline{N4}$, $\overline{N5}$, N6 and $\overline{N7}$. These signals together with the strobe signal are applied to the two NAND gates 424, 426. The outputs of the two NAND gates are combined and applied to an inverter 428. When the inverter applies a high signal to the reset terminal of the flip-flop 416, the flip-flop is reset thereby disenabling NAND gate 420 and terminating the flashing signals.

The video signals are applied to the video input amplifier of a cathode-ray tube monitor 57 where these video signals are mixed in well-known manner with blanking control signals as required for display.

The foregoing comprises a description of a video display control system wherein data from a data source may be entered into the memory of the display control system at an address therein corresponding to the address of a cursor displayed on a CRT face. The cursor moves with the inputted data. When in the display or read mode, the data in the memory is read out. Each data word corresponds to an alpha-numeric character or symbol if desired. Each data word being read out of the memory is converted to a pair of selection signals. A character generator generates a train of pulses for each character or symbol which are timed to occur so that they may be displayed at commercial television sweep frequencies across the face of a cathode-ray tube to present an alpha-numeric character. The two selection signals select which ones of the pulse trains are to be displayed.

The characters selected are displayed across the face of the cathode-ray tube. These may be displayed either with a cursor or without a cursor. Furthermore, if desired, a word may be made to flicker to call attention thereto.

The display control system functions to present a display with a television monitor which operates at commercial television scanning frequencies. Accordingly, no special sync generators and no special scanning rasters are required for this system. Accordingly, the cost of a monitor which can function with this display control system is relatively inexpensive.

Although particular embodiments of the invention have been described and illustrated herein, it is recognized that modifications and variations may readily occur to those skilled in the art and consequently it is intended that the claims be interpreted to cover such modifications and equivalents.

What we claim is:

1. In a system for displaying alpha-numeric characters stored as data word signal sets in a memory, which are sequentially read out of said memory for the purpose of displaying said characters in synchronism with vertical and horizontal sync signals;

a character generator including counter means responsive to said horizontal sync signals for producing successive pairs of output signals representative of addresses of successively occurring points within a two dimensional array;

a plurality of sets of first selecting gate means, each set connected for selecting a sequence of pairs of output signals from said counter means which provide successively occurring points which when displayed represent an alpha-numeric character;

a plurality of disenabled second selecting gate means;

means for connecting the output of each of said set of first selecting gate means to the input of a different one of said plurality of second selecting gate means;

decoding means connected to said plurality of disenabled second selecting gate means and responsive to a data word signal set read out from said memory for enabling the one of said second selecting gate means which has applied thereto a sequence of signals corresponding to successively occurring points which when displayed will represent the alpha-numeric character represented by the data word signal set;

display means to which said vertical and horizontal sync signals are applied; and means for applying the output of said enabled second selecting gate means to said display means to be displayed.

2. Apparatus as recited in claim 1 wherein said counter means includes an X counter and a Y counter;

clock oscillator means;

means for applying a horizontal sync pulse to said clock oscillator means for enabling it to produce a predetermined number of pulses per horizontal sync pulse;

means for applying the pulse outputs of said clock oscillator means to said X counter to cause it to count through a predetermined number of its cycles corresponding to the number of characters desired to be displayed on a line; and means for applying horizontal sync pulses to said Y counter and to cause it to advance its count responsive thereto.

3. Apparatus as recited in claim 2 wherein there is included a character counter means having the same count capacity as the number of characters to be displayed on a line;

a line counter means having the same count capacity as the number of lines of characters to be displayed;

means for applying a count output from said X counter to said character counter means during a count cycle of said X counter to advance said character counter;

means for applying one count output from said Y counter to said line counter means during a count cycle of said Y counter to advance said line counter means; and means for deriving an address from the count output of said character and line counter of a location in said memory from which the next character to be displayed will be read.

4. Apparatus as recited in claim 3 wherein there is included:

a cursor character counter means having the same count capacity as the number of characters to be displayed on a line;

a cursor line counter means having the same count capacity as the number of lines of characters to be displayed;

means for advancing the count of said cursor character counter means;

means for advancing the count of said cursor line counter means one each time said cursor character counter means attains a full count;

means for comparing the count outputs of said character counter means and cursor character counter means and said line counter means and said cursor line counter means;

means responsive to said means for comparing sensing an identity in the counts of said compared character counter means and said compared line counter means for producing a cursor signal; and means for displaying said cursor signal on said display means at an address determined by the count outputs of said cursor counters.

5. Apparatus as recited in claim 4 wherein there is included a means responsive to the count output of said cursor character counter means and said cursor line counter means for generating memory address signals indicating the location for writing data into said memory gate means for comparing counts of line counter means and cursor counter means and character counter means and cursor character counter means and producing an output when they are identical;

means responsive to output from said gate means for comparing for entering a data word signal set into said memory at a location determined by said memory address signals.

6. Apparatus as recited in claim 1 wherein said plurality of disenabled second selecting gate means includes a plurality of three input coincidence gates arranged in columns and rows;

a plurality of row busses each of which is connected to one input of all of the coincidence gates in each of the different rows of coincidence gates;

a plurality of column busses each of which is connected to a second input of all of the coincidence gates in each of the different columns of coincidence gates; and means for connecting the output of each of a different one of said plurality of coincidence gates;

said decoding means including first gate means for energizing one of said plurality of row busses responsive to one portion of a data word signal set; and second gate means for energizing one of said plurality of column busses responsive to the remaining portion of the data word signal set whereby the coincidence gate connected to the energized row and column bus is enabled.

7. A system for displaying alpha-numeric characters arranged in successive lines of characters across a cathode-ray tube face comprising:

means for sequentially generating sets of binary signals each set being representative of an alpha-numeric character desired to be displayed;

means for generating horizontal and vertical sync signals;

character generator means responsive to said horizontal and vertical sync signals for generating a plurality of signal pulse trains, each of which forms a different alpha-numeric character when displayed in synchronism with said horizontal and vertical sync signals;

said character generator means including an X counter means actuated responsive to a horizontal sync pulse for generating a plurality of output pulses responsive thereto;

Y counter means actuated responsive to a horizontal sync pulse for generating a pulse responsive thereto;

a set of selecting gate means for each alpha-numeric connected for selecting outputs from said $x$ and $y$ counter means which provide a signal pulse train which forms the alpha-numeric character when displayed in synchronism with said horizontal and vertical sync signals;

a plurality of disenabled output gate means, one for each alpha-numeric character;

means connecting each disenabled output gate means to the output of one of said sets of selecting gate means;

a plurality of row busses;

a plurality of column busses;

means connecting each of said disenabled output gate means to one of said row busses and one of said column busses;

decoding gate means to which said binary signal sets are applied for energizing one of said row busses and one of said column busses which are connected to the one of said disenabled output gate means which produces responsive thereto at its output a signal pulse train which forms the alpha-numeric character when displayed in synchronism with said horizontal and vertical sync signals; and cathode-ray tube means to which said horizontal and vertical sync signals together with said signal pulse train are applied for displaying the alpha-numeric character represented by the binary signal set applied to said decoding gate means.

8. A system as recited in claim 7 wherein the means for generating sets of binary signals includes memory system means for storing sets of binary signals at predetermined addresses;

means for successively generating addresses for sequentially reading out the stored sets of binary signals including:

character counter means having the same count capacity as the number of characters to be displayed on a line;

a line counter means having the same count capacity as the number of lines of characters to be displayed;

means for applying a count output from said $x$ counter to said character counter means during a count cycle of said $x$ counter means to advance the count of said character counter means;

means for applying a count output from said $y$ counter to said line counter means during a count cycle of said $y$ counter means to advance the count of said line counter means; and means responsive to the count output of said character counter and line counter for generating the address of the next set of binary signals to be read from said memory means.

9. A system as recited in claim 8 wherein there is included:

a cursor character counter means having the same count capacity as the number of characters to be displayed on a line;

a cursor line counter means having the same count capacity as the number of lines of characters to be displayed;

means for advancing the count of said cursor character counter means;

means for advancing the count of said cursor line counter means once each time said cursor character counter means attains a full count;

means for comparing the count outputs of said character counter means and cursor character counter means and said line counter means and said cursor line counter means;

means responsive to said means for comparing sensing an identity in the counts of said compared character counter means and said compared line counter means for producing a cursor signal; and means for displaying said cursor signal on said display means at an address determined by the count outputs of said cursor counters.

10. A system as recited in claim 9 wherein there is included a means responsive to the count output of said cursor character counter means and said cursor line counter means for generating memory address signals indicating the location for writing data into said memory gate means for comparing counts of line counter means and cursor counter means and character counter means and producing an output when they are identical;

means responsive to output from said gate means for comparing for entering a data word signal set into said memory at a location determined by said memory address signals; and means for advancing the count of said cursor character counter means for each set of binary signals to be entered into memory.

11. Apparatus as recited in claim 7 wherein there is included means responsive to a first predetermined binary signal set for causing alpha-numeric characters which are being displayed to flicker, said means including:

an oscillator;

a coincidence gate having two inputs;

means connecting said oscillator to one of said two inputs;

means connected to said memory means output for recognizing said first predetermined binary signal set for applying an enabling signal to said coincidence gate second input;

means for applying said gate output to said cathode-ray tube device to cause a flickering of the characters which are being displayed while set coincidence gate is enabled;

means connected to said memory means output for recognizing a second predetermined binary signal set for removing said enabling signal from said coincidence gate second input.

12. A system for displaying alpha-numeric characters arranged in successive lines of characters across the face of a cathode-ray tube comprising memory means for storing sets of binary signals, each set being representative of an alpha-numeric character desired to be displayed and stored at a different location therein having a different address, means for generating horizontal sync signals and vertical sync signals, first counter means responsive to said horizontal and vertical sync signals for successively producing pairs of output signals representative of dot addresses in a two dimensional dot matrix, a plurality of sets of logic gates means for selecting with each set of gate means those outputs of said first counter means which provide dot addresses in said two dimensional matrix which form a numeric character, second counter means responsive to the outputs of said first counter means for successively producing pairs of output signals representative the successive addresses of characters which are displayed across the face of said cathode-ray tube, third counter means for producing a pair of output signals representative of the address of the location desired for displaying a cursor on the face of said cathode-ray tube, means for advancing the count of said third counter means, means responsive to each pair of output signals of said second counter means for generating the address of a binary signal set in said memory, means responsive to the signals representative of the address of a binary signal set for reading said binary signal set out of said memory, means responsive to the binary signal set read from said memory for selecting the output signals from a set of logic gates provide dot addresses in said two dimensional matrix which forms a character corresponding to the one represented by said binary signal set, means for comparing the outputs of said second and third counter means and producing an identity signal when the addresses represented by these outputs correspond, means for producing a cursor signal responsive to said identity signal, and means for applying said vertical and horizontal sync signals, said selected output signals and said cursor signal to said cathode-ray tube whereby said character and cursor signal are displayed.

13. A system as recited in claim 12 wherein the horizontal sync signals and vertical sync signals generated by said means for generating provide a scanning raster for substantially the entire cathode-ray tube face.